United States Patent [19]
Zicker et al.

[11] Patent Number: 5,144,649
[45] Date of Patent: Sep. 1, 1992

[54] CELLULAR RADIOTELEPHONE CREDIT CARD PAYSTATION METHOD

[75] Inventors: Robert G. Zicker; Thanh H. Cao, both of Houston; Daniel G. Borkowski, The Woodlands; Donald A. Plouff, The Woodlands; Phillip D. Brown, Jr., The Woodlands, all of Tex.

[73] Assignee: GTE Mobile Communications Service Corporation, Houston, Tex.

[21] Appl. No.: 602,698

[22] Filed: Oct. 24, 1990

[51] Int. Cl.⁵ .................................................. H04M 11/00
[52] U.S. Cl. .................................... 379/59; 379/144; 379/91; 379/145
[58] Field of Search .................... 379/58, 59, 63, 91, 379/143–145, 357; 340/825.54

[56] References Cited

U.S. PATENT DOCUMENTS

| | | |
|---|---|---|
| Re. 32,115 | 4/1986 | Lockwood et al. . |
| 3,576,402 | 4/1971 | Baker . |
| 3,696,335 | 10/1972 | Lemelson ............................... 379/91 |
| 4,233,473 | 11/1980 | Frost . |
| 4,326,123 | 4/1982 | Hosterman . |
| 4,337,463 | 6/1982 | Vangen ........................... 340/825.54 |
| 4,399,330 | 8/1983 | Kuenzel . |
| 4,411,017 | 10/1983 | Talbot . |
| 4,439,636 | 3/1984 | Newkirk et al. . |
| 4,517,412 | 5/1985 | Newkirk et al. . |
| 4,549,308 | 10/1985 | LoPinto . |
| 4,577,061 | 3/1986 | Katzeff et al. . |
| 4,595,983 | 6/1986 | Gehalo et al. . |
| 4,621,326 | 11/1986 | Rawlins . |
| 4,625,276 | 11/1986 | Benton et al. . |
| 4,675,863 | 6/1987 | Paneth et al. . |
| 4,706,275 | 11/1987 | Kamil . |
| 4,715,061 | 12/1987 | Norwich . |
| 4,727,569 | 2/1988 | Kutrieb et al. . |
| 4,731,818 | 3/1988 | Clark, Jr. et al. ..................... 379/144 |
| 4,776,003 | 10/1988 | Harris . |
| 4,777,646 | 10/1988 | Harris . |
| 4,831,647 | 5/1989 | D'Avello et al. . |
| 4,860,336 | 8/1989 | D'Avello et al. . |
| 4,860,341 | 8/1989 | D'Avello et al. . |
| 4,920,562 | 4/1990 | Hird et al. ............................. 379/144 |
| 4,975,942 | 12/1990 | Zebryk ................................... 379/144 |
| 5,046,082 | 9/1991 | Zicker et al. ............................. 379/63 |

FOREIGN PATENT DOCUMENTS 0214126  10/1985  Japan ..................................... 379/63

OTHER PUBLICATIONS

"Advanced Mobile Phone Service: Control Architecture", *The Bell System Technical Journal*, Jan., 1979, by Fluhr et al.

*Primary Examiner*—James L. Dwyer
*Assistant Examiner*—Dwayne D. Bost
*Attorney, Agent, or Firm*—Lowell W. Gresham; Don J. Flickinger; Jordan M. Meschkow

[57] ABSTRACT

A system (10) for operating a multiplicity of credit card reader-equipped cellular mobile radiotelephones (CMRs 12) as credit card paystations is disclosed. The CMRs (12) incorporate a remotely programmable unit (RPU 48) which controls credit card operation (1400, 1700) and which controls data communication sessions (188, 1900, 2100) with a credit card (CC) host (26) and a remote programming (RP) host (24). The RPU (48) resides between a conventional control unit (CU 42) and a conventional transmit/receive unit (TRU 62) of a conventional CMR. The RPU (48) monitors messages (1200, 1300) transmitted from the CU (42) and from the TRU (62). The CMR (12) powers up in a locked state (1402), within which a credit card (88) may be read. The credit card is locally validated (1421) at CMR 12. If the validation is successful, the CMR (12) is unlocked so that a call may be placed. Credit card information, called number, call time, call duration, and system identification number (SID) are recorded (1700) in a call record for each call established through the CMR (12). Call records are accumulated within the CMR (12). After each call, accumulated CMR (12) usage is checked (1730) against fraud alert thresholds. When a threshold is exceeded, an external credit card validation is performed (1744). Upon a daily schedule which activates during off-peak hours, the CMR (12) calls the CC host (26) to upload (1830) the accumulated call records.

22 Claims, 21 Drawing Sheets

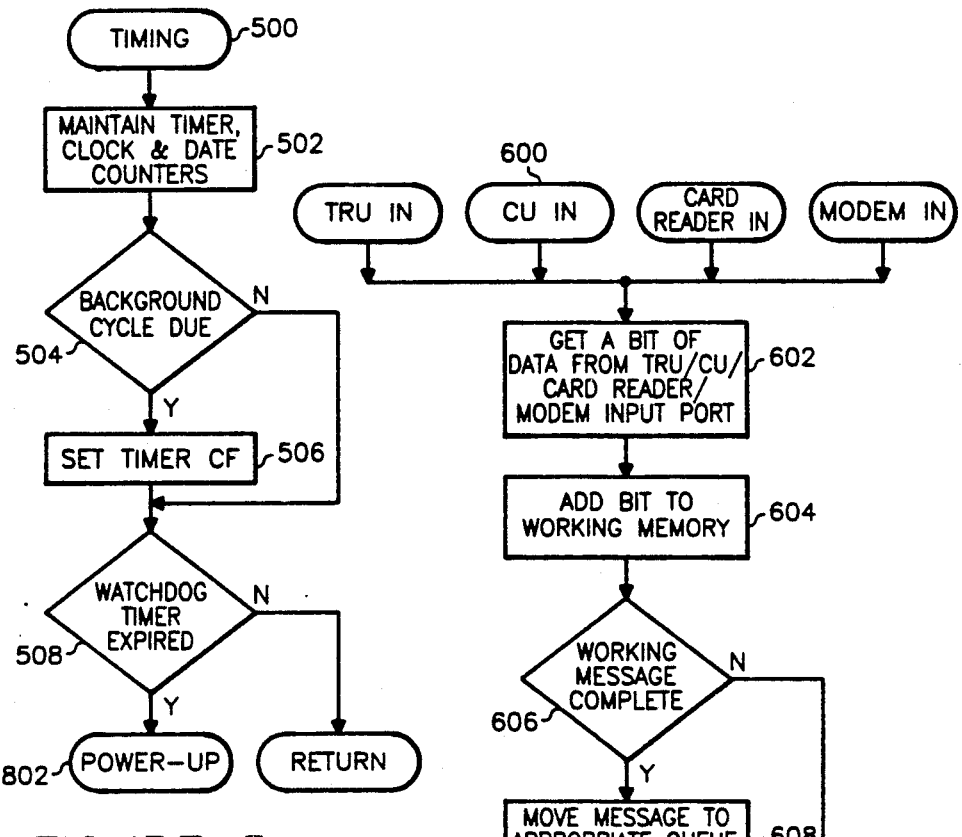
FIGURE 5
FIGURE 6
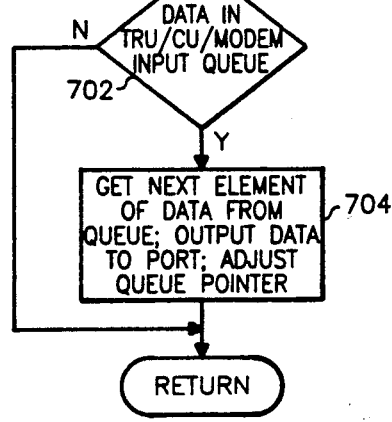
FIGURE 7

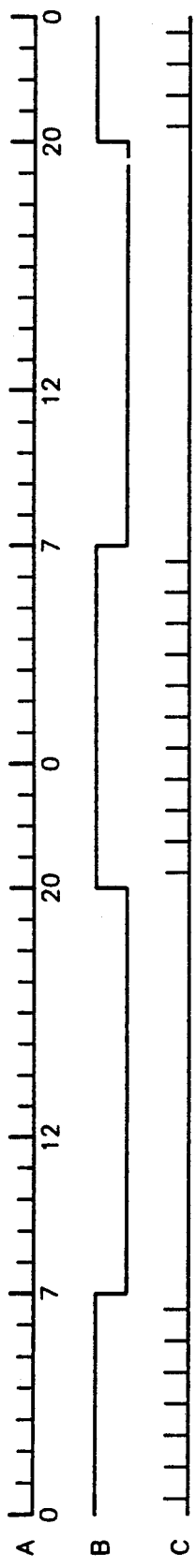
FIGURE 11
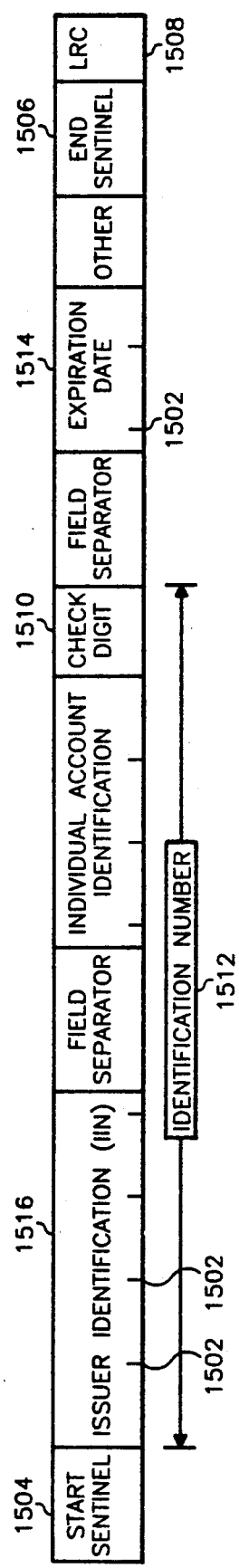
FIGURE 15
FIGURE 20

CELLULAR RADIOTELEPHONE CREDIT CARD PAYSTATION METHOD

RELATED PATENTS

The present invention is related to:

1. "Remote Accessing System for Cellular Telephones," by Robert G. Zicker, et al., Ser. No. 07/518,774, U.S. Pat. No. 5,046,082, filed May 2, 1990, and assigned to the assignee of the present invention;

2. "Method of Selecting the Cellular System with which a Roaming Cellular Mobile Radiotelephone Communicates," by Robert G. Zicker, Ser. No. 07/603,816, filed Oct. 24, 1990, and assigned to the assignee of the present invention; and 3. "Adaptable Vehicle Alarm Detection and Reporting System," by Robert G. Zicker, Ser. No. 07/603,815, filed Oct. 24, 1990, and assigned to the assignee of the present invention.

1. Technical Field of the Invention

The present invention relates generally to cellular mobile radiotelephones (CMRs). More specifically, the present invention is related to methods for using remotely programmable CMRs in a system within which the CMRs serve as credit card paystations through which customers purchase telecommunication services.

2. Background of the Invention

Cellular mobile radiotelephones (CMRs) have been in widespread commercial use for only a few years. Within these few years, CMRs have been adapted to operate within systems that use the CMRs as pay-telephones. Such pay service systems typically secure payment through credit cards. Credit card reader-equipped CMRs are installed in rental cars, taxis, limousines, and the like. While such conventional CMR pay-telephone systems have functioned adequately in the past, they nevertheless suffer numerous drawbacks which seriously impede usage of the CMR pay systems for communicating large volumes of call traffic.

For example, conventional CMR pay service systems typically require the CMR to place a "system" call to a credit card clearing house prior to permitting a customer to place his or her "customer" call. The system call validates or authorizes the use of the credit card in paying for the customer call and passes information used in billing or in authorizing only particular calls. However, the vast majority of credit card issuers do not require pre-authorization as a condition of billing. At the present time, only the issuer of an AT&T calling card requires such pre-authorization. Accordingly, most customers have credit cards which do not require such pre-authorization, and most cellular credit card calls are made using credit cards that do not require such pre-authorization.

This type of pre-authorization poses numerous problems in a cellular pay service system. For example, "pre-screening" limits pay service access to only those users who have cards described in the credit card clearing house's data base. Furthermore, this "pre-screening" technique wastes radio airtime. While the waste of radio airtime may not have been a serious problem when the cellular telecommunication industry was in its infancy, the seriousness of this problem has increased in direct proportion to the growth in cellular call traffic. In the future, radio airtime is projected to be a scarce commodity which needs to be conserved as much as possible.

The pre-screening process additionally increases system overhead costs associated with the pay-telephone system. A cellular telecommunication service provider requires payment from the CMR pay service provider for the authorization call in addition to payment for the customer's call. Thus, pay service costs are increased, and such costs must be passed along to pay service customers. For this and other reasons, telecommunication service costs to pay service customers have been higher than necessary.

Moreover, the pre-screening process causes the pay service customer to wait until completion of the system authorization call before the customer can place his or her customer call. The authorization call often takes upwards of a minute to complete. Pay service customers generally find this wait to be a highly undesirable and frustrating experience that impedes their use of the pay service.

Furthermore, conventional CMR pay service systems require CMR equipment which is uniquely designed to accommodate their own CMR pay service systems. Since the CMR pay service equipment does not have an enormous mass market, like normal cellular service, its initial cost has been disproportionately high. On top of the high initial cost, installation costs have also been unnecessarily high. For example, when car-rental agencies provide CMR pay service in their rental cars, the CMR pay equipment must be installed and removed frequently because such agencies tend to keep their cars for only a short time. These continuous installation and removal costs are factored into the price of pay service that a customer purchases through such equipment to keep the price at a high level.

Still further, conventional CMR pay service systems need call record data which must be supplied from cellular service providers before billing information can be compiled and passed along to appropriate financial institutions. This is a highly undesirable requirement. It causes increased costs due to the coordination efforts that are needed to obtain such data from multiple cellular service providers. In addition, it delays the compilation of billing data, the collection of payment by CMR pay service providers, and the posting of pay service charges to customers' credit card accounts.

SUMMARY OF THE INVENTION

Accordingly, it is an advantage of the present invention that an improved CMR pay service system and method is provided.

Another advantage of the present invention is that a system call need not accommodate each credit card validation. Consequently, radiotelephone airtime is reduced, system overhead costs are reduced, and customers need not wait for remote credit card validation to take place before placing their customer calls.

Another advantage of the present invention is that the vast majority of system administrative calls are placed during daily off-peak operating hours when the cellular radiotelephone airwaves are usually under utilized. Thus, the present invention serves to efficiently utilize cellular radiotelephone airtime by spreading its usage out over time.

Still another advantage is that the method of the present invention does not limit pay service to users having credit cards described in a single local, limited database of valid cards.

Yet another advantage is that the method of the present invention accumulates sufficient data for billing records to be compiled and presented to financial institutions without relying upon data from cellular service providers.

Still another advantage is that the method of the present invention relies extensively upon normal, mass market CMR equipment to reduce costs.

Yet another advantage is that the method of the present invention operates a CMR in pay-telephone and non-pay-telephone modes. Consequently, a credit card CMR paystation may be easily converted into a normal CMR without encountering significant retrofit or installation costs.

The above and other advantages of the present invention are carried out in one form by an improved method of operating a remotely programmable cellular telephone as a credit card paystation. The method disables operation of the telephone in response to telephone energization to prevent customers from using the phone without first presenting a credit card. Credit card information is read from a credit card, and a local validation of the credit card is performed by processing the credit card information. If the local validation is successful, operation of the telephone is enabled. As a customer uses the telephone to place or receive calls, the telephone's usage is recorded. The telephone's usage is then compared with predetermined fraud alert threshold data. When the telephone's usage exceeds the threshold data, a data communications session is automatically established with a credit card authorization system to remotely validate the credit card. If the credit card authorization system invalidates the credit card, the method disables the telephone so that the customer cannot make subsequent calls.

The above and other advantages of the present invention are carried out in another form by an improved method of operating a remotely programmable cellular telephone as a credit card telephone paystation. This method periodically receives synchronization data from outside of the telephone. The synchronization data serves to set a time and date for a clock portion of the telephone. The clock is continuously maintained in a current state. Credit card information is read from a credit card, and the credit card information is validated. Upon a successful validation of the credit card information, the operation of the telephone is enabled so that a customer may use the telephone to establish a customer call. A call record, which includes data describing the customer call and the credit card information, is stored within the telephone. The clock is monitored to detect the occurrence of a predetermined point in time. When the predetermined point in time occurs, a system call is automatically placed to a host computer system. If the system call is successfully established, the call record is transferred to the host computer system.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 5 shows a flow chart of a timing interrupt routine performed by the RPU portion of the present invention;

FIG. 6 shows a flow chart of data input interrupt routines performed by the RPU portion of the present invention;

FIG. 7 shows a flow chart of data output interrupt routines performed by the RPU portion of the present invention;

FIG. 11 shows a timing diagram for potential data communication sessions between a CMR and a credit card host computer;

FIG. 15 shows a data formatting diagram for the information recorded on a credit card readable by a CMR of the present invention;

FIG. 20 shows a data format diagram for the information included in a call record communicated between the CMR and credit card host.

DETAILED DESCRIPTION OF THE PREFERRED EMBODIMENT

Figure 1:
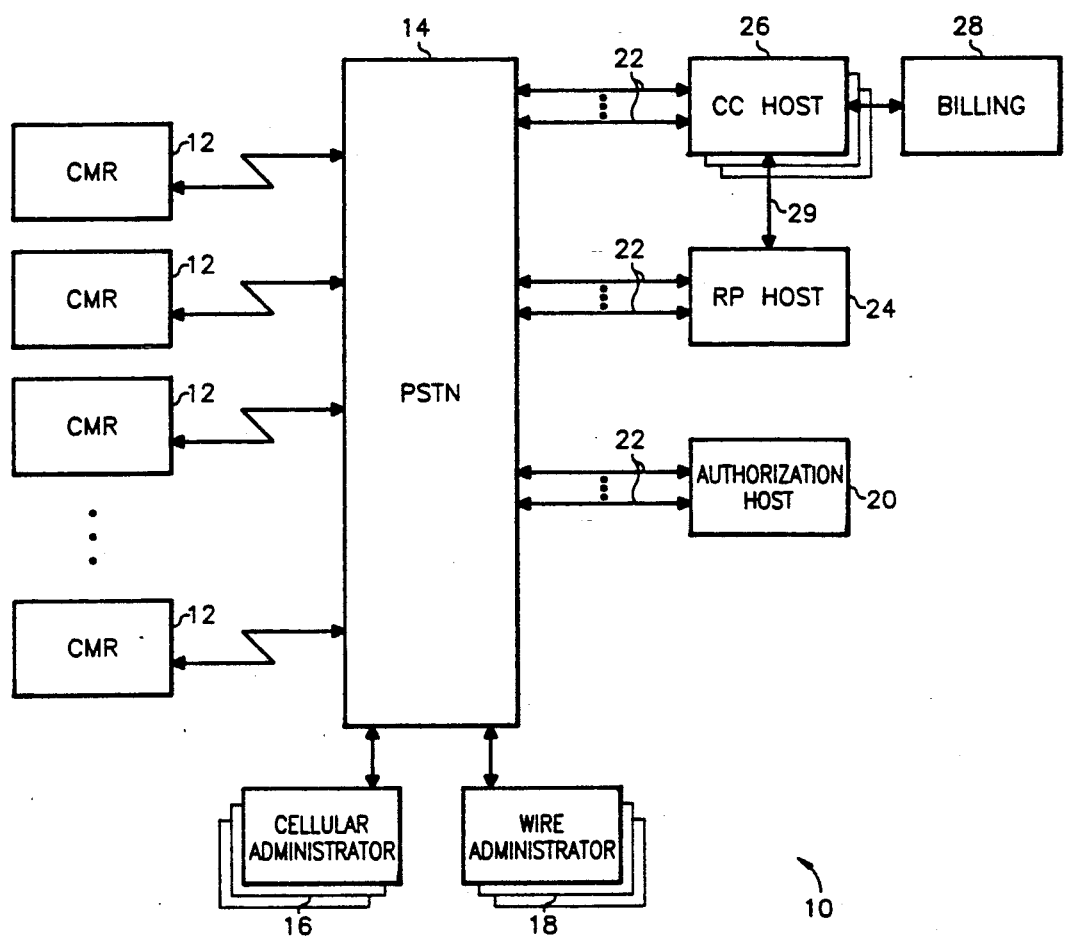
FIG. 1 shows a block diagram of a credit card cellular radiotelephone paystation system constructed in accordance with the present invention.

FIG. 1 shows a block diagram of a credit card cellular radiotelephone paystation system 10 constructed in accordance with the present invention. System 10 includes a multiplicity of credit card reader-equipped cellular mobile radiotelephones (CMRs) 12. The precise number of CMRs 12 is not a critical feature and may range from a few to many tens of thousands. Each of CMRs 12 may selectively be in radio communication with the conventional public switched telephone network (PSTN) 14. For the purposes of the present invention, PSTN 14 includes all the conventional cellular radio systems, cellular switching systems, trunks, satellites, and land-wired switching systems which are well known to those skilled in the art. Cellular administrators 16 couple to PSTN 14 to control call record management and billing needs for cellular services. In addition, wire-based administrators 18 couple to PSTN 14 to control call record management and billing needs for local and long distance wire-based telecommunication services.

PSTN 14 couples to several data processing devices which are included within system 10. These devices are constructed from conventional computer hardware and include conventional processors, memory, keyboards, video display terminals, printers, modems, and the like (not shown), all of which are well known to those skilled in the art.

In particular, system 10 includes an authorization host 20 which couples to PSTN 14 through at least one, but preferably many, subscriber loops 22. Authorization host 20 is a computer system that performs the well known clearing house function of validating credit cards. In general, authorization host 20 receives calls through PSTN 14. These calls establish data communication links through which credit card account information is passed, typically from a point-of-sale terminal, to authorization host 20. As discussed below, CMRs 12 operate as point-of-sale terminals for telecommunication services within system 10. Authorization host 20 consults data stored in local databases (not shown) to determine whether a credit card (not shown) from which the account information has been read is valid. Authorization host 20 then passes data describing the results of this determination back to the calling party to help the calling party decide whether to accept or reject the credit card. Since many versions of authorization host 20 are known to those skilled in the art, authorization host 20 is not discussed further herein.

System 10 also includes a remote programming (RP) host 24, which couples to PSTN 14 through at least one, but preferably many, subscriber loops 22. RP host 24 is a computer system that remotely controls the programming of CMRs 12. Generally speaking, RP host 24 periodically engages in data communication sessions with CMRs 12. During such sessions RP host 24 and a CMR 12 exchange data. Thus, data tables, timing data, threshold values, predetermined telephone numbers, modes of operation flags, virtually any item of application data, and executable machine code utilized within the CMR 12 may be altered as a result of such sessions. Specific details of a preferred implementation of remote programming host 24 and its relation to remotely accessible cellular radiotelephones are provided in the above-listed related patent references.

In addition, system 10 includes one or more credit card (CC) hosts 26, each of which couples to PSTN 14 though at least one, but preferably many, subscriber loops 22. The precise number of CC hosts 26 employed in system 10 is not a critical feature. Generally, speaking, each CC host 26 accommodates up to several thousand "client" CMRs 12, and CC hosts 26 may be added as needed to best accommodate growth in the number of CMRs 12 included in system 10. Each CC host 26 is a computer system that communicates with CMRs through "system" calls. These system calls permit CC hosts 26 to help control call record management and billing needs for the credit card pay service provided through CMRs 12. By strategically locating CC hosts 26 within the overall geographical area within which system 10 operates, cost savings associated with shorter-distance system calls may be favorably balanced against CC host 26 acquisition, installation, and operation costs to minimize the overhead expenses for system 10.

Generally speaking, CC host 26 serves three functions. First, CC host 26 performs security handshaking procedures so that CMRs 12 can thereafter engage in a data communication session with CC host 26. Second, CC host 26 collects call records from CMRs 12, reformats such call records, and passes such call records along to a billing system 28. Third, CC host 26 collects credit card account information from CMRs 12, formats the credit card account information into a form required by authorization host 20, and passes such account information to authorization host 20. Validation data from authorization host 20 are likewise reformatted if necessary and passed back to CMRs 12 through CC host 26. The use of CC host 26 as a buffer for data communication between a CMR 12 and authorization host 20 enhances security of the data within the CMR 12 by restricting the access to security handshaking procedures to only CC host 26. In addition, it simplifies the programming of CMRs 12 and permits CC host 26 to utilize a variety of different authorization hosts 20 as needs arise.

Billing system 28 generally processes the call records it receives in a conventional fashion. Such processing calculates charges to be collected from identified credit card account numbers that are associated with each call record. These calculations are based upon the duration of the calls, the cellular systems used in making the calls, the locations of the called parties (i.e. long distance charges), and overhead charges. In addition, this processing calculates payable charges and identifies the parties to whom payments must be made. Such parties may, for example, include car rental agencies that provide credit card pay service for their rental customers. Since similar and identical billing systems are well known and understood in the telecommunications industries, billing system 28 is not discussed further herein.

CC host 26 additionally engages in data communication sessions with remote programming host 24. In the preferred embodiment, such data communication sessions take place over a dedicated communication link 29, but those skilled in the art will recognize that PSTN 14 may also be used to provide the communication link. During communication sessions between hosts 24 and 26, CC host 26 may advantageously identify to remote programming host 24 those CMRs 12 that might need maintenance or which require certain reprogramming (discussed below).

Figure 2:
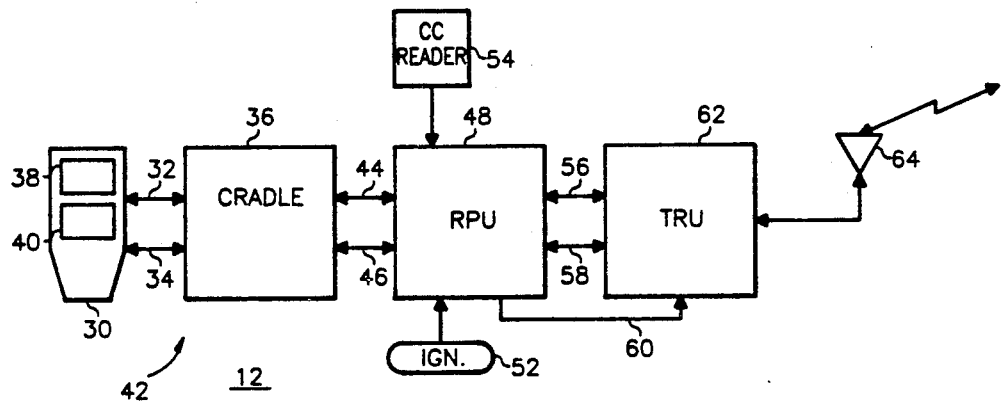
FIG. 2 shows a block diagram of a cellular mobile radiotelephone (CMR) used in connection with the system of the present invention.

FIG. 2 shows a block diagram of a preferred CMR 12 used in connection with system 10. CMR 12 includes a handset 30 which is coupled through a first serial data bus 32 and a first audio bus 34 to a cradle 36. Handset 30 includes a display 38 and an array of keys 40. Together, handset 30 and cradle 36 are referred to as a control unit (CU) 42. CU 42 is a conventional control unit that performs functions which are well known in the art of cellular telephony.

A second serial data bus 44 and a second audio bus 46 interconnect cradle 36 with a remote programmable unit (RPU) 48. In addition, an ignition input 52 to RPU 48 couples to the ignition of an automobile (not shown) in which CMR 12 is installed. Likewise, a conventional credit card reader 54 couples to RPU 48. Card reader 54 may include a dual head reader capable of reading both track one and track two of a credit card's magnetic stripe. All American Banking Association (ABA) credit card formats will be read via track two, while the information on track one may be used for other types of credit cards, such as the Hertz Gold Card and the AT&T calling card. RPU 48 regenerates serial and audio busses 44 and 46 as serial data and audio busses 56 and 58, respectively. In addition, RPU 48 has a simulated ignition output 60. Busses 56 and 58, and output 60 couple to a conventional transmit-receive unit (TRU) 62. As is conventional, an antenna 64 through which TRU 62 communicates with PSTN 14 (see FIG. 1) also couples to TRU 62. RPU 48 may represent a kit which is installed between a conventional CU 42 and a conventional TRU 62 of a conventional non-credit card paystation CMR. The use of conventional non-credit card equipment as a platform to which remote programmability and credit card pay service hardware are added reduces costs due to the mass production of such conventional equipment. Preferably, RPU 48 and reader 54 are physically mounted to CU 42.

Figure 3:
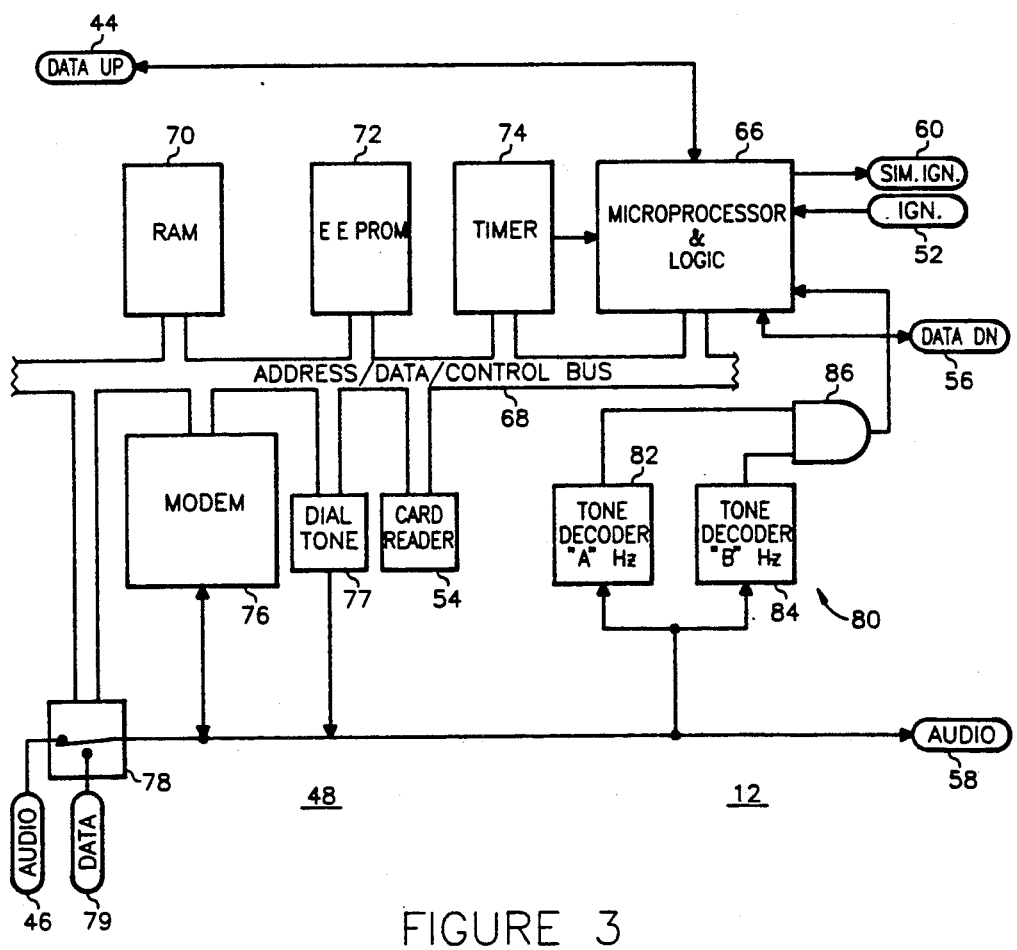
FIG. 3 shows a block diagram of a remotely programmable unit (RPU) portion of the CMR of the present invention.

FIG. 3 presents a block diagram of hardware included in a preferred RPU 48. As shown in FIG. 3, a microprocessor and logic section 66 is coupled to serial data bus 44 and to an internal address/data/control bus 68. Through bus 68, section 66 communicates with a random access memory (RAM) 70, a non-volatile, read-write memory 72, such as an electrically erasable PROM (EEPROM), a timer 74, a data port of a modem 76, credit card reader 54, a dial tone generator 77, and a control input of a switch 78. An output of dial tone generator 77 couples to audio bus 58. Switch 78 switches the audio between audio bus 46 and an RJ11 port 79, through which CMR 12 transmits and receives data communications. Another port of switch 78 is coupled to audio bus 58. Those skilled in the art will understand that RAM 70 is one example of a volatile read-write type of memory, and battery-backed-up RAM and other memory devices may serve as non-volatile read-write memory 72. An audio port of modem 76 is additionally coupled to audio bus 58, and timer 74 preferably is coupled to an interrupt input of section 66.

Microprocessor and logic section 66 generally controls the operation of RPU 48. In conjunction with timer 74, section 66 maintains a clock and calendar. Moreover, power is continually supplied to section 66, timer 74, and supporting sections of RPU 48 so that data describing the date and time remain current even when ignition to a vehicle in which CMR 12 is installed is "off".

Modem 76 represents a conventional modem circuit. Consequently, modem 76 recognizes audio signals on audio bus 58. Likewise, modem 76 supplies audio signals to audio bus 58. Modem 76 preferably operates at conventional data rates, such as 300, 1200, or 2400 bits per second, depending on control data supplied by microprocessor section 66. Communicated data and control data, such as carrier detect, are communicated to and from microprocessor section 66 through bus 68. On the other hand, ring detect is detected by microprocessor section 66 by monitoring data commands on serial data bus 56.

Section 66 senses the state of ignition signal 52. In addition, section 66 senses the state of an output from a signal detection circuit 80. Signal detection circuit 80 includes first and second tone decoders 82 and 84, respectively. Inputs of tone decoders 82 and 84 are coupled to audio bus 58, and outputs of tone decoders 82 and 84 are coupled to inputs of a logic element 86, which performs a logical AND function. The output of element 86 serves as the output of signal detection circuit 80 and is coupled to a sensing input of section 66.

Section 66 also provides a control output bit, which is coupled to simulated ignition signal 60. The conventional TRU 62 (see FIG. 2) senses this simulated ignition signal in lieu of ignition signal 52, that it would otherwise sense in a conventional CMR installation. Simulated ignition signal 60 responds to both the state of ignition signal 52 and to the date and time data maintained in conjunction with timer 74. Hence, RPU 48 causes conventional TRU 62 to alter its conventional operation in accordance with the method of the present invention, discussed below.

Signal detection circuit 80 is configured to detect a predetermined login audio tone. In the preferred embodiment, this login tone includes two predetermined frequencies, labeled as "A" and "B" in FIG. 3. Frequencies A and B are selected so that the login tone is as unique as possible within normal telecommunication. In other words, the login tone is unlikely to be present during normal telecommunication operations, other than in a login procedure, discussed below in connection with FIG. 19.

The method of the present invention is practiced, at least in part, by RPU 48. As discussed above CU 42 and TRU 62 (see FIG. 2) are provided by conventional non-paystation, non-remotely programmable cellular radiotelephone equipment. Specifically, in the preferred embodiment, a cellular telephone manufactured by the OKI corporation as model EM-23 serves as CU 42 and TRU 62. Generally speaking, microprocessor and logic section 66 of RPU 48 practices this method by executing programming instructions stored in memories 70–72. This method involves, at least in part, the processing of data to control the operation of system 10 (see FIG. 1). Some of the specific processing tasks are directly related to the data messages and data formats dictated by the above-mentioned OKI model EM-23 cellular telephone. However, other conventional cellular telephones have similar or identical types of data messages and can be adapted by those skilled in the art for use in connection with the present invention.

Figure 4:
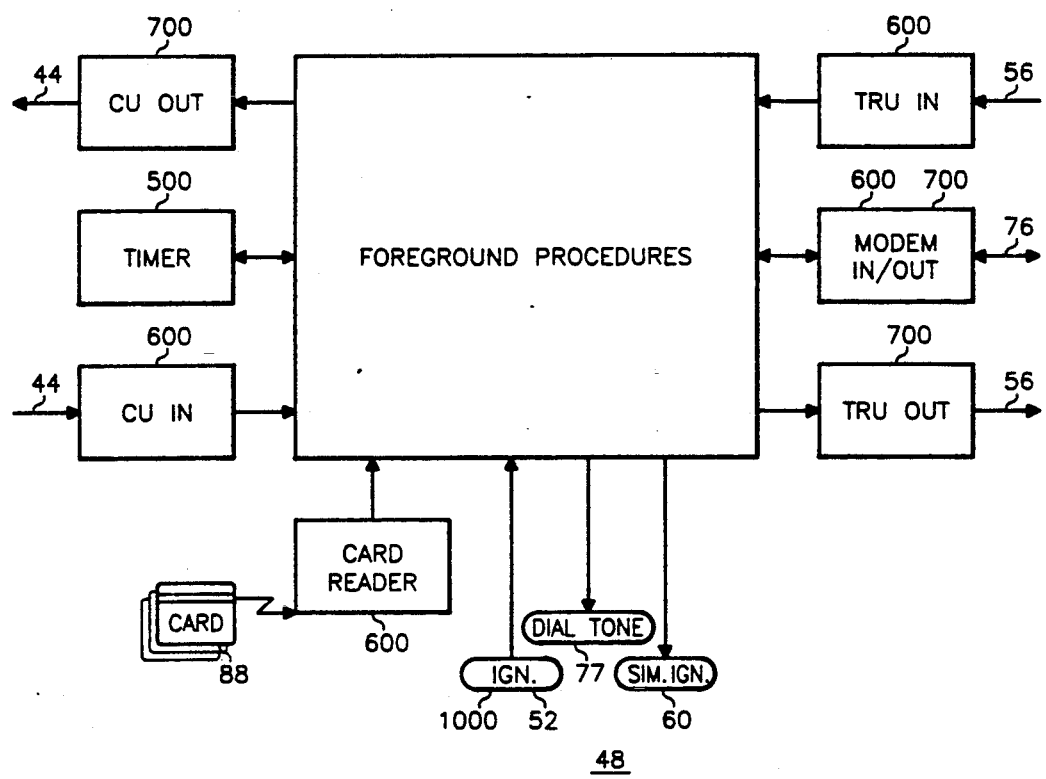
FIG. 4 shows a block diagram of data flow into and out from the RPU portion of the present invention.

With respect to the data processing performed by RPU 48, FIG. 4 shows a block diagram of data flow into and out of RPU 48. Generally speaking, the flow of this data is controlled by various background software procedures. For example, RPU 48 receives data concerning date and time through the operation of a timer background procedure 500, which is described in more detail below in connection with FIG. 5.

Input background procedures serve to manage the reception of serial data from serial data busses 44 and 56, credit cards 88, and through modem 76. The input background procedures generally place data received at RPU 48 into appropriate queues so that they may be processed by various foreground software procedures. For the purposes of the present invention, each of input background procedures CU-In, TRU-In, Card Reader-In, and Modem-In operate similarly. Thus, a generic background data input interrupt procedure 600, which may serve the various data input roles, is discussed below in connection with FIG. 6.

Likewise, output background procedures coordinate the transmission of data on data busses 44 and 56 and through modem 76. The output background procedures retrieve data placed in their queues by the various foreground software procedures and cause the data to be transmitted at an appropriate port. Output background procedures CU-Out, TRU-Out, and Modem-Out are performed similarly. Thus, a generic background data output interrupt procedure 700, which may serve any of these various data output roles, is discussed below in connection with FIG. 7.

In addition, the foreground procedures monitor ignition input signal 52, and set or reset output signals which operate dial tone generator 77 and which serve as simulated ignition signal 60. These foreground procedures are discussed below in connection with FIGS. 8-21.

Background timing procedure 500, shown in FIG. 5, is performed by microprocessor section 66 and timer 74 of RPU 48 (see FIG. 3) in response to an interrupt generated by timer 74. This interrupt occurs on a regular basis, such as once every few milliseconds. As shown in a task 502, timing procedure 500 maintains timer, clock, and date counters so they remain current. As discussed above, even when vehicle ignition is removed, microprocessor section 66 and timer 74 remain energized so that the timers, clocks, and date counters operate even when TRU 62 and other portions of CMR 12 (see FIG. 2) are de-energized.

An inquiry task 504 of procedure 500 inquires whether the clock counter contains a value which indicates that a background application procedure 1000 (discussed below in connection with FIG. 10) should be activated. Background application procedure 1000 is actually a foreground procedure which is used to perform tasks similar to those performed in background procedures. In the preferred embodiment, procedure 1000 is activated once every several milliseconds, at a rate which is considerably slower than the performance of timing procedure 500. When the cycle for background application procedure 1000 is due, a task 506 sets a Timer condition flag (CF). The method of the present invention uses numerous condition flags, and the discussion below refers to such condition flags by the acronym "CF". The timer CF eventually causes the foreground procedures to perform procedure 1000, in a manner discussed below in connection with FIGS. 8-9.

Procedure 500 additionally includes an inquiry task 508, which monitors the one of its counters that is serving as a watchdog timer. If this counter has reached a predetermined value, a catastrophic type of timeout condition has occurred. When this happens, program control is transferred to a power-up task 802, discussed below in connection with FIG. 8. However, so long as this watchdog timer has not expired, timing procedure 500 returns to the procedure being executed when the timer interrupt was initially received.

As discussed above, background input data procedure 600, flow chart shown in FIG. 6, illustrates the tasks used by each of CU-In, TRU-In, Card Reader-In, and Modem-In procedures. Procedure 600 is invoked whenever a bit (or byte in the case of the Modem-In procedure) of data has been received. A task 602 gets a bit of data from an appropriate input port. For the CU-In procedure, this input port is the one coupled to serial data bus 44 (see FIG. 4); for the TRU-In procedure, the input port is the one coupled to serial data bus 56; for the Card Reader-In procedure, the input port is the one coupled to card reader 54 (see FIGS. 2-3); and, for the Modem-In procedure, the input port is the one coupled to Modem 76 (see FIG. 3).

After task 602, a task 604 adds the bit or byte of received data to a working message, and an inquiry task 606 determines whether the working message is complete. When the received data is an entire byte of data, the message may be complete upon each reception. However, when data is received one bit at a time, the bits are collected until an entire message has been received. When the working message is not yet complete, data input procedure 600 simply causes program control to return to the procedure that was being executed when procedure 600 was initially invoked.

On the other hand, when task 606 discovers that the working message is complete, a task 608 moves the completed message to an appropriate queue and clears the working message to make buffer space for a subsequent input. For CU-In and TRU-In procedures, the message-receiving queues are input queues for forward command (FCMD) and reverse command (RCMD) application procedures 1200 and 1300, respectively. FCMD and RCMD application procedures 1200 and 1300 are discussed below in connection with FIGS. 12 and 13, respectively. Along with moving the completed message to an appropriate queue, task 608 also sets appropriate condition flags (CFs) to signal the presence of the input message. For CU-In and TRU-In procedures, RCMD_Queued and FCMD_Queued CFs, respectively, are set. For Card Reader-In and Modem-In procedures, Reader_Queued and Modem_Queued CFs, respectively, are set.

As discussed above, background output data procedure 700, flow chart shown in FIG. 7, illustrates the tasks used by each of CU-Out, TRU-Out, and Modem-Out procedures. Procedure 700 is invoked whenever a bit (or byte in the case of the Modem-Out procedure) is ready for output. The preferred embodiment of the present invention invokes CU-Out and TRU-Out procedures once every 800 microseconds, and this rate is determined from a timing signal mixed with data presented on serial data busses 44 and 56. Accordingly, data transmissions among TRU 62, RPU 48, and CU 42 remain synchronized with one another.

In an inquiry task 702, procedure 700 determines whether data is present in the appropriate input queue for procedure 700. If data is available, a task 704 removes the next data element (either a bit or a byte) from the queue and outputs the data element to the appropriate port. Of course queue pointers and data element counters are adjusted so that the subsequent data element will be output next and so that freed up queue space may be utilized for receiving additional data. After task 704 and when task 702 determines that no data is available in its queue for output, procedure 700 causes program control to return to the procedure that was being executed when procedure 700 was initially invoked.

Figures 8, 9:
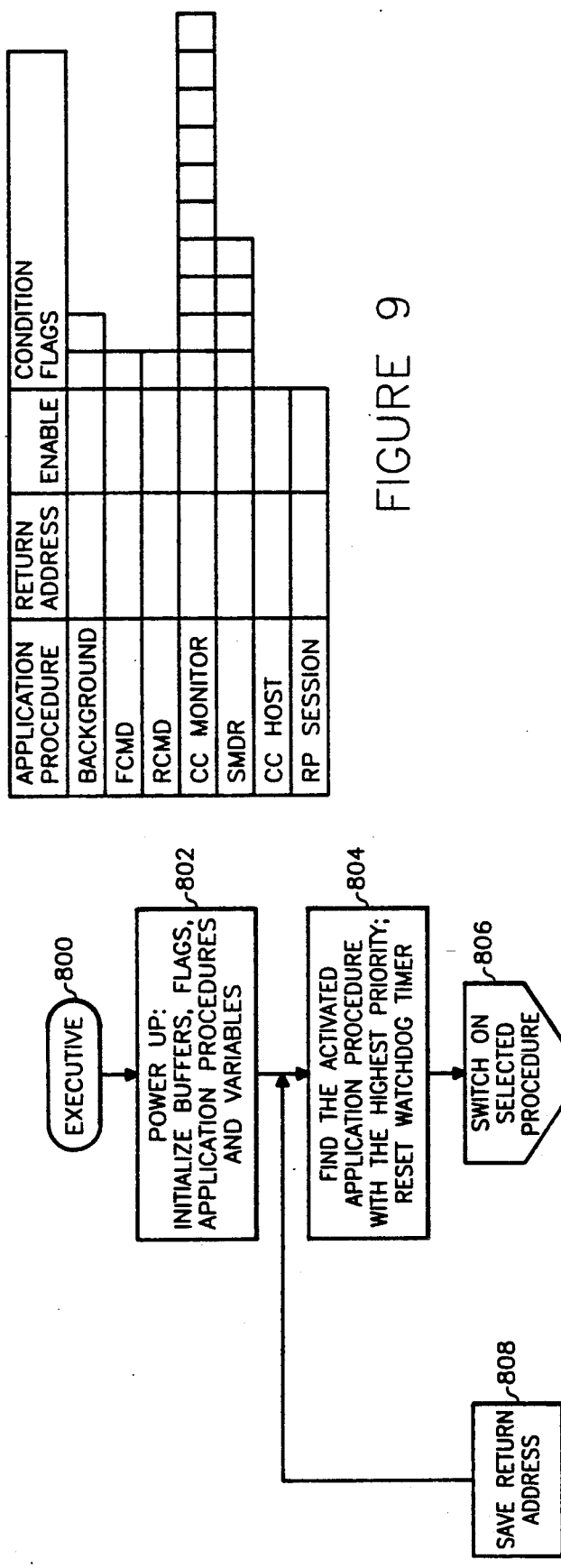
FIG. 8 shows a flow chart of an executive procedure performed by the RPU portion of the present invention.
FIG. 9 shows a diagram of a data structure used by the executive procedure in routing program control to various application procedures performed by the RPU portion of the present invention.

As discussed above, FIGS. 8-21 present information related to foreground procedures performed by the present invention. Generally speaking, these foreground procedures consist of several application procedures that are managed by an executive 800. FIG. 8 shows a flow chart of executive 800. The application procedures are configured so that once they are invoked, they relinquish control back to the executive within a short period of time, whether or not they have completed their execution. Executive 800 then determines which of the application procedures is activated for execution and which has the highest priority among those that are activated. Of course, the background procedures discussed above may be invoked at any time during operation of executive 800 or during operation of the application procedures.

With reference to FIG. 8, executive 800 includes the power-up task 802 that was discussed above in connection with FIG. 5. In the preferred embodiment, power-up task 802 is performed only when power is section 66 and timer 74 (see FIG. 3) or when the above-discussed watchdog timer expires. Under normal operation, the watchdog timer should not expire, and microprocessor section 66 remains continuously energized, even when vehicle ignition is off. Thus, in the preferred embodiment of the present invention, task 802 is performed only rarely.

Task 802 initializes the operation of RPU 48. This initialization includes the disabling of interrupts and application procedures until initialization is complete, the resetting of condition and other flags, and the initialization of variables. Upon completion of task 802, the interrupts are re-enabled, background, FCMD, RCMD, and CC monitor application procedures, 1000, 1200, 1300, and 1400, respectively, are enabled, and CMR 12 (see FIG. 1) is prepared for operation.

After task 802, a task 804 resets the watchdog timer. In resetting the watchdog timer, program control must return to task 804 prior to expiration of the watchdog timer or timer procedure 500 (see FIG. 5) will force a power-up reset to occur. Task 804 also determines which of the application procedures is activated, and of those which are activated, which one has the highest priority.

Executive 800 constructs and maintains data structure 900, which is illustrated in FIG. 9, to aid in making this determination. Data structure 900 includes several data elements associated with each of the application procedures. One data element is used to indicate the address at which program control should be routed when the application is next invoked. During the power-up initialization of task 802, these addresses are set to the respective beginnings of the application procedures. However, during operation of the present invention, they may change as the application procedures are performed. Another data element indicates whether the application procedure is enabled. If an application procedure is disabled, it cannot be considered activated. However, if an application procedure is enabled, it is considered activated only when at least one of the associated condition flags (CFs) is set. Accordingly, data structure 900 also associates an identification of various condition flags with each application procedure.

The data elements in data structure 900 may advantageously be arranged so that a prioritization scheme is implied. Thus, task 804 of executive 800 may simply examine the "enable" and "condition flag" data elements in a predetermined order wherein the first activated application procedure encountered automatically has a higher priority than all other activated application procedures. As shown in switching task 806, program control is then switched to the selected application procedure at the address associated in data structure 900 with the selected application procedure.

Executive 800 may route program control to any one of: 1) background procedure 1000, 2) FCMD procedure 1200, 3) RCMD procedure 1300, 4) CC monitor procedure 1400, 5) SMDR procedure 1700, 6) CC host procedure 1800, 7) RP session procedure 2100, or other application procedures which are not related to the present invention. Each of these procedures returns program control to executive 800. Upon return, a task 808 saves an appropriate return address of the previously invoked procedure at the appropriate location within data structure 900.

Figure 10:
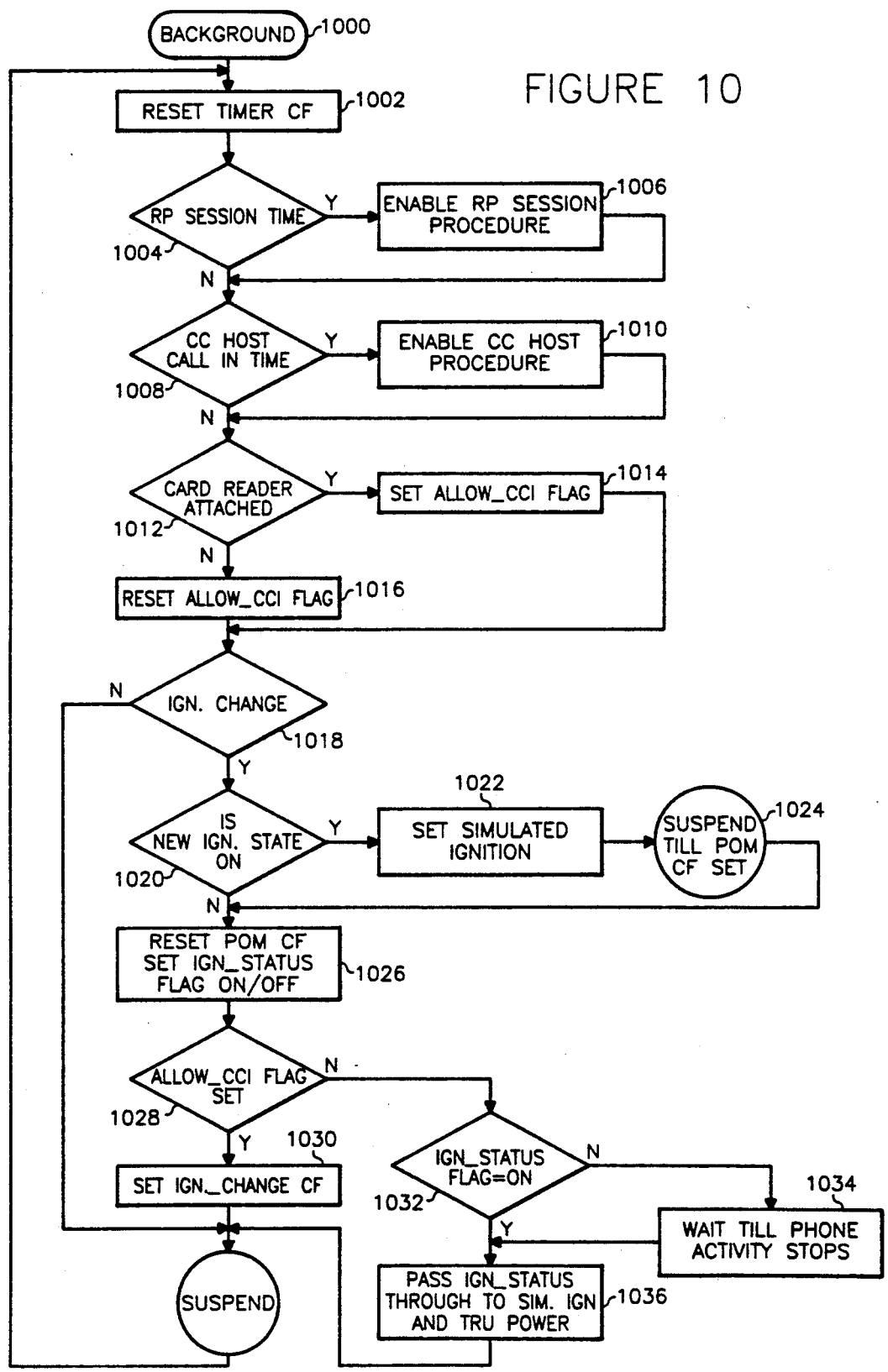
FIG. 10 shows a flow chart of a background application procedure performed by the RPU portion of the present invention.

FIG. 10 shows a flow chart of background application procedure 1000. As mentioned above, background application procedure 1000 performs tasks similar to tasks performed by the background procedures discussed above in connection with FIGS. 5-7. Such tasks relate to the monitoring of timing and external inputs.

With reference to FIG. 10, a task 1002 resets the timer CF. As discussed above in connection with FIG. 5, the timer CF was set when timer procedure 500 determined that it was time to activate background application procedure 1000. This condition was signalled by setting the timer CF. Upon power-up, data structure 900 (see FIG. 9) was modified to indicate that background application procedure 1000 was enabled. Thus, when the timer CF was set, executive 800 (see FIG. 8) caused program control to switch to procedure 1000. By resetting the timer CF in task 1002, procedure 1000 will not be again invoked until the next time procedure 500 determines that it should be invoked.

Procedure 1000 additionally includes an inquiry task 1004 that determines whether it is time to engage in a remote programming session. Remote programming sessions occur on a periodic basis in a manner determined by programming within memory 72 of RPU 48 (see FIG. 2). Generally speaking, task 1004 compares the current date and time, maintained by timer procedure 500, with a stored value. If the current date and time equals or exceeds the stored value, a task 1006 enables RP session application procedure 2100 by setting the appropriate enable data element in data structure 900 (see FIG. 9).

After task 1006 or when task 1004 determines that it is not now time for an RP session, an inquiry task 1008 performs a similar determination as discussed above for task 1004. However, task 1008 determines whether it is time to enable CC host procedure 1800. This determination is made by comparing the current time with a wakeup time value. When the predetermined point in time occurs, a task 1010 enables the appropriate data element in data structure 900 (see FIG. 9). As a consequence of setting this flag, procedure 1800, discussed below in connection with FIG. 18, will cause CMR 12 to place a call to CC Host 26 (see FIG. 1).

FIG. 11 presents a timing diagram which defines these points in time for system 10 (see FIG. 1). Trace A of FIG. 11 shows the hours of the day on a 24 hour basis for two days. Trace B shows the portion of a 24 hour cycle within which such calls to CC host 26 occur. Specifically, these system calls are permitted only during off-peak hours, such as between 20:00 and 07:00. Task 1008 will not signal a call-in time during on-peak hours, such as between 07:00 and 20:00. The off-peak hours indicated in FIG. 11 are referred to as a daily reporting window.

Trace C of FIG. 11 shows hourly reporting windows included within the daily reporting window. In the preferred embodiment, the specific hourly reporting window depends on the electronic serial number (ESN) of the CMR 12 which is attempting to calculate it. In the preferred embodiment, the least significant digit of the ESN is used to indicate which of ten possible, six minute hourly reporting windows is allocated to the CMR 12. Thus, if the ESN ends in a "0", then task 1008 concludes that CC host call-in time exists during 0-5 minutes past the top of each hour of the daily reporting window. Similarly, if the ESN ends in a "1", then task 1008 concludes that CC host call-in time exists during 6-11 minutes past the top of each hour of the daily reporting window, and so on.

The timing illustrated in FIG. 11 serves at least two desirable purposes for system 10. As shown in trace B, the daily reporting window causes these system calls to occur only during off-peak hours. Thus, cellular radiotelephone airtime is used efficiently because such calls will occur when airtime is usually under-utilized. Furthermore, as shown in trace C, the hourly reporting window tends to spread access attempts to CC host 26 out over the daily reporting window rather than have all client CMRs 12 attempt calls to CC host 26 at the same time. Thus, the probability of successfully establishing and completing a single system call increases, and the amount of time for which each CMR 12 must be fully energized for attempting such calls is reduced. Overall vehicle battery power consumption is reduced as a consequence.

With reference back to FIG. 10, after task 1010 or when task 1008 determines that it is not now time to place a call to CC host 26, an inquiry task 1012 determines whether or not card reader 54 (see FIGS. 2-3) is attached to RPU 48. This determination is made by reading data from the port that receives card reader data. Electrical cables to card reader 54 are configured so that when card reader 54 is electrically coupled to RPU 48, a data bit exhibits a first state, and when card reader 54 is not coupled to RPU 48 this data bit exhibits a second state. When card reader 54 is attached, an Allow_CCI flag is set (task 1014); and, when card reader 54 is not attached, the Allow_CCI flag is reset (task 1016). As described in more detail below, a consequence of this determination will be that CMR 12 operates as a credit card paystation when card reader 54 is attached but as a normal, non-paystation cellular radiotelephone when it is not attached.

By allowing convenient operation in a non-paystation mode, CMR 12 performs a valuable service (i.e. non-paystation cellular service). Consequently, when a CMR 12 is no longer needed as a paystation CMR, it need not be removed from a rental car or the like. Rather, only card reader 54 may be removed and CMR 12 automatically operates as a normal, non-paystation cellular radiotelephone. This alternate valuable service gives the equipment of the present invention increased salvage value, which tends to permit reduced pay-service costs for pay-service customers.

After tasks 1014 and 1016, an inquiry task 1018 determines whether the ignition of the vehicle has recently changed states. This determination may be performed by comparing an ignition status flag with the current ignition signal 52 (see FIGS. 2-4). The ignition status flag records a previously detected ignition state, and if ignition signal 52 differs from this recorded state, then a change has occurred. When an ignition change has occurred, an inquiry task 1020 determines whether the new state is the "on" state. If the "on" state is detected, a task 1022 sets the simulated ignition output, which causes TRU 62 to power up. Next, program control returns to executive 800 (see FIG. 8) until a power on message (POM) CF is set by RCMD procedure 1300, as discussed below.

FIG. 10 illustrates the routing of program control back to executive 800 as a suspension task 1024. When program control returns from executive 800, it will resume with a task 1026. In the meantime, microprocessor section 66 (see FIG. 3) is free to perform other activated processing tasks while background application procedure 1000 waits for the occurrence of the anticipated POM. In particular, when TRU 62 has initialized itself and is prepared for cellular radiotelephone operation, it sends a predetermined power on or "welcome" message (POM) on serial data bus 56 toward CU 42 (see FIG. 2). However, this message is intercepted by RPU 48 in RCMD procedure 1300. RCMD procedure sets the POM CF, and this causes executive 800 to eventually switch program control back to task 1026 of background application procedure 1000.

Procedure 1000 also performs task 1026 when task 1020 determines that the changed ignition status is now "off". Task 1026 resets the POM CF and sets the Ignition_Status flag "on" or "off" in accordance with its current state. Next, an inquiry task 1028 determines whether the Allow_CCI flag is set, indicating that CMR 12 should operate in its credit card paystation mode of operation. When the Allow_CCI flag is set, procedure 1000 sets an Ign_Change CF in a task 1030. This CF will activate one of the many processes performed within CC monitor procedure 1400, discussed below in connection with FIGS. 14.

When the Allow_CCI flag is reset, indicating that CMR 12 should operate as a normal, non-paystation CMR, program control proceeds from task 1028 to an inquiry task 1032. Task 1032 controls program flow based upon the Ign_Status flag. When the ignition is "off", procedure 1000 is halted or suspended until all telephone activity which may be in progress halts in a task 1034. After task 1034 or when the ignition is "on", the ignition signal is passed through to the simulated ignition signal (task 1036).

As shown in FIG. 10, when the ignition has not changed at task 1018, and after tasks 1030 or 1036, program control suspends operation in procedure 1000 and returns to executive 800. Upon the next return to procedure 1000, program control will return to task 1002, discussed above. The next return results from the setting of the timer CF, discussed above.

Figure 12:
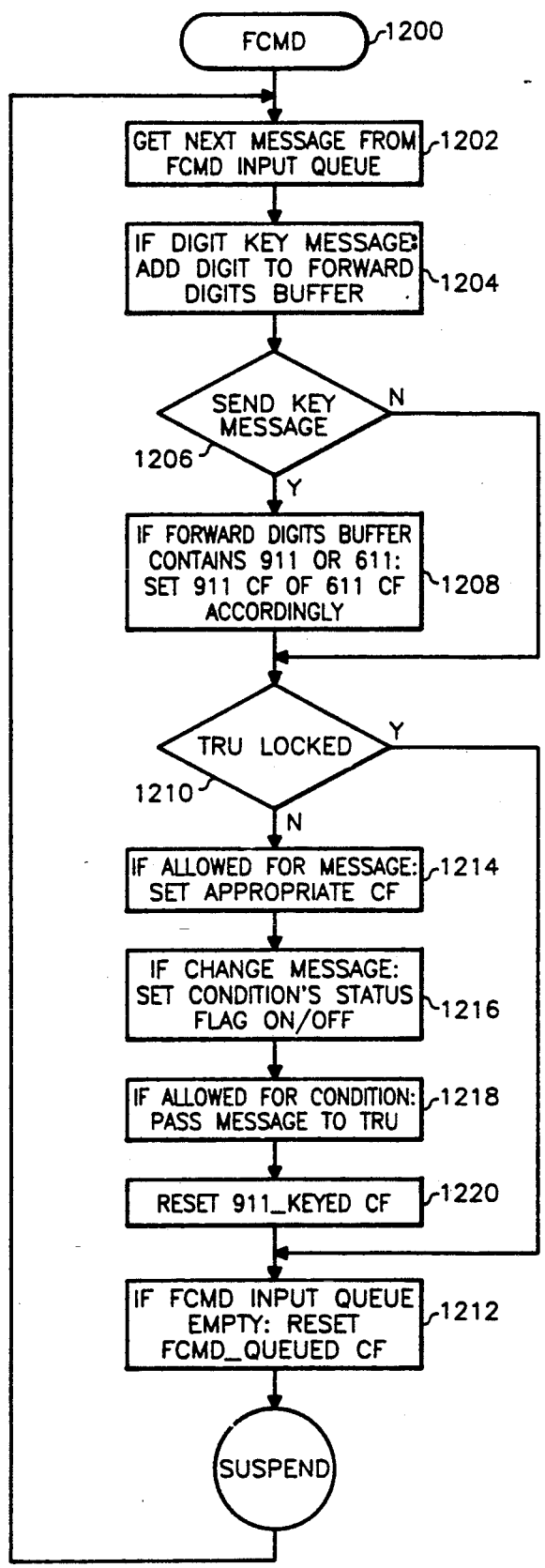
FIG. 12 shows a flow chart of a forward command (FCMD) application procedure performed by the RPU portion of the present invention.

FIG. 12 shows a flow chart of tasks performed within forward command (FCMD) application procedure 1200. FCMD procedure is performed when a message is received from CU 42 (see FIG. 2) and processed through the CU-In background procedure, discussed above in connection with FIG. 6. Generally speaking, FCMD procedure 1200 processes data messages traveling from CU 42 toward TRU 62 (see FIG. 2). Based on this processing, data in various buffers and various condition flags are maintained in a current form. In addition, FCMD procedure 1200 decides whether or not to pass such messages on to TRU 62. In addition to FIG. 12, TABLE I, presented below, describes the operation of FCMD procedure 1200.

TABLE I

| FCMD Condition | Condition flag | Pass message (if unlocked) |
|---|---|---|
| Redial Key Message | Redial_Keyed | N |
| Lock Key Message | Lock_Keyed | N$^A$ |
| Data Key Message | Data_Keyed | N |

TABLE I-continued

| FCMD Condition | Condition flag | Pass message (if unlocked) |
|---|---|---|
| Tele. No. Message | This_Phone | N |
| Send Key Message | — | Y[B] |
| Digit Key Message | Digit_Keyed | Y |
| Hooksw. Change Message | Hookswitch_Change | Y |
| Other Message | — | Y |
| 911 + send condition | 911_Keyed | Y |
| 611 + send condition | 611_Keyed | N |

[A]May not be passed to TRU if Allow_CCI flag is reset.
[B]Not passed if 611_Keyed CF is set.

With reference to FIG. 12 and TABLE I, a task 1202 of FCMD procedure 1200 gets the next message present in its input queue. This message was placed there by background data input procedure 600, as discussed above in connection with FIG. 6. Next, a task 1204 examines this message to determine whether it indicates that a digit key has been pressed on keypad 40 of CU 42 (see FIG. 2). A digit key is associated with the numerals 0-9. If a digit key was pressed, task 1204 adds, or concatenates, the digit to any digits already in a forward digits buffer.

After task 1204, an inquiry task 1206 determines whether the message indicates that a "send" key of keypad 40 has been pressed. When the "send" key is pressed, a task 1208 first examines the above-discussed forward digits buffer to see if the send key followed the digits "9-1-1" or the digits "6-1-1". If a "send" followed a "911", then task 1208 sets a 911_Keyed CF; and, if a "send" followed a "611", then task 1208 sets a 611_Keyed CF. Those skilled in the art will appreciate that the 911 and 611 telephone numbers represent emergency numbers. The 911 number is a well known PSTN emergency number and the 611 number is a private emergency number. The present invention permits such emergency calls without requiring credit card payment therefor, as discussed below in connection with CC monitor procedure 1400 (see FIGS. 14).

After task 1208 or when task 1206 determines that the message that FCMD procedure 1200 is currently processing does not indicate the pressing of the "send" key, an inquiry task 1210 determines whether TRU 62 (see FIG. 2) is currently locked. The locked state for TRU 62 is well known to those skilled in the art of cellular telephony. It generally prevents usage of a cellular telephone. Task 1210 makes its determination by examining a variable that keeps track of the locked/unlocked status of TRU 62. When TRU 62 is locked, messages from CU 42, other than the above-discussed 611 and 911 emergency calls, are ignored. Accordingly, when TRU 62 is locked, program control proceeds to a task 1212 to update the FCMD_Queued CF, which controls the invoking of FCMD procedure 1200. Specifically, when the FCMD input queue is empty, indicating that no more input messages are present for FCMD procedure 1200 to process, the FCMD_Queued CF is reset so that procedure 1200 will not be invoked again until such messages are present. Next, procedure 1200 is suspended, and program control returns to executive 800 (see FIG. 8).

On the other hand, when TRU 62 is unlocked, a task 1214 sets an appropriate CF for the message being processed. TABLE I lists various messages which may be sent from CU 42 toward TRU 62 and processed by FCMD procedure 1200. In addition, TABLE I lists the names of various condition flags which are set in response to the detection of these messages. Next, a task 1216 sets a condition status flag in accordance with a change type of message. For example, when a hookswitch change message is detected, task 1214 sets the Hookswitch_Change CF. Task 1216 then sets a Hookswitch_Status flag to indicate either an on-hook or off-hook state.

After task 1216, a task 1218 selectively passes the message on toward TRU 62. TABLE I lists the messages and conditions which cause task 1218 to pass a message on toward TRU 62. For example, the Redial key, Lock key, Data key, and Telephone No. key messages each indicate the pressing of keys that are customized for CMRs 12. RPU 48 handles the processing which results from the pressing of these keys. Thus, such messages are not sent to TRU 62. However, the Send key, Hookswitch change, and other messages are required by TRU 62 for proper operation, and they are passed to TRU 62. Messages are passed to TRU 62 by placing them in an input queue for the TRU-Out procedure discussed above in connection with FIG. 7.

After task 1218, a task 1220 resets the 911_Keyed CF. The 911_Keyed CF may have been set above in task 1208. However, RPU 48 need not take special steps to allow the 911 call when TRU 62 is unlocked. No special steps are needed because the "911" digits and "send" messages have already been passed to TRU 62 at this point in procedure 1200. Thus, the 911 call will be placed without further processing by RPU 48. The resetting of the 911_Keyed CF will prevent RPU 48 from taking further action with respect to the placing of the emergency call when TRU 62 is unlocked. After task 1220, program control proceeds to task 1212, discussed above.

Figure 13:
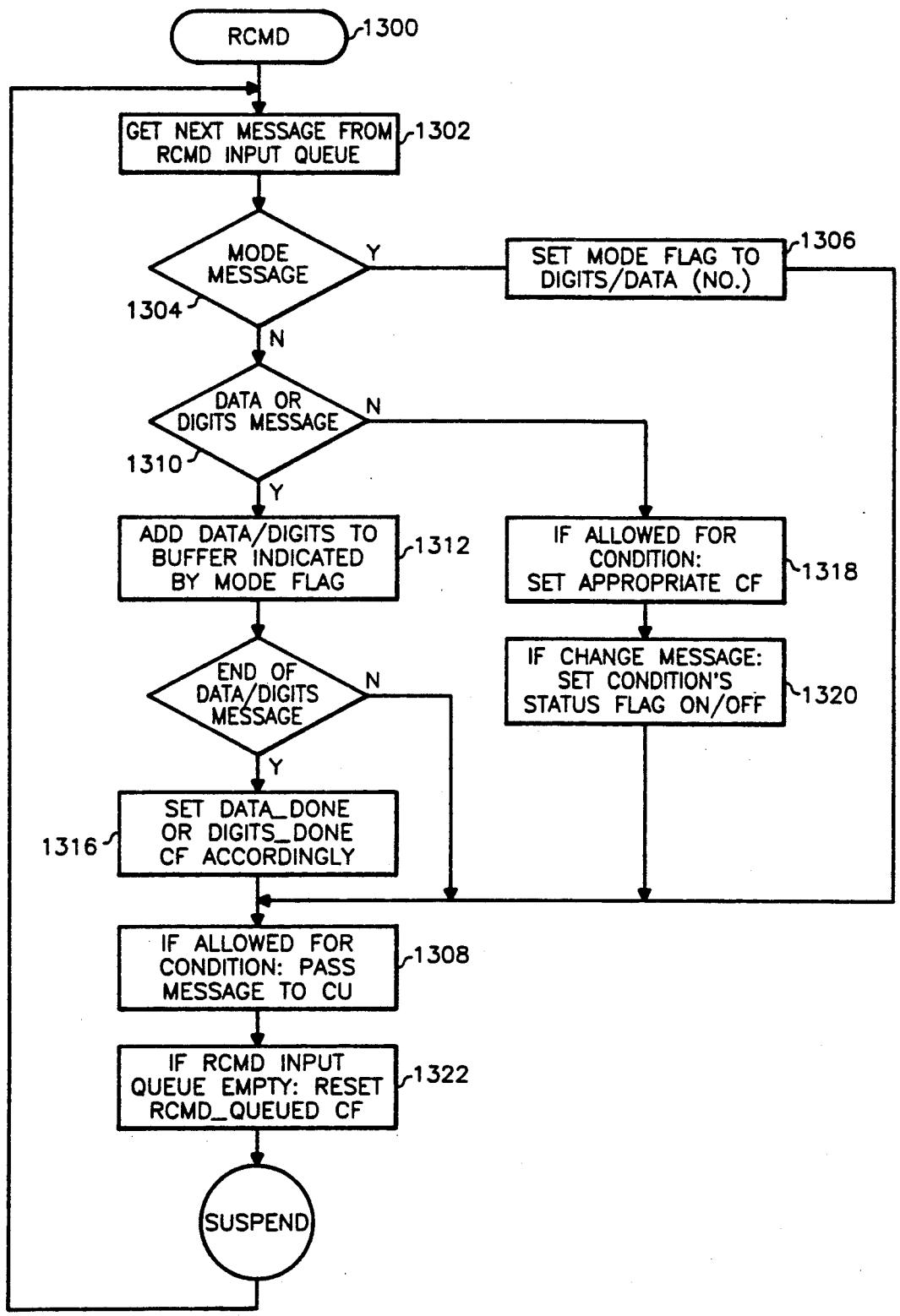
FIG. 13 shows a flow chart of a reverse command (RCMD) application procedure performed by the RPU portion of the present invention.
Figure 14A:
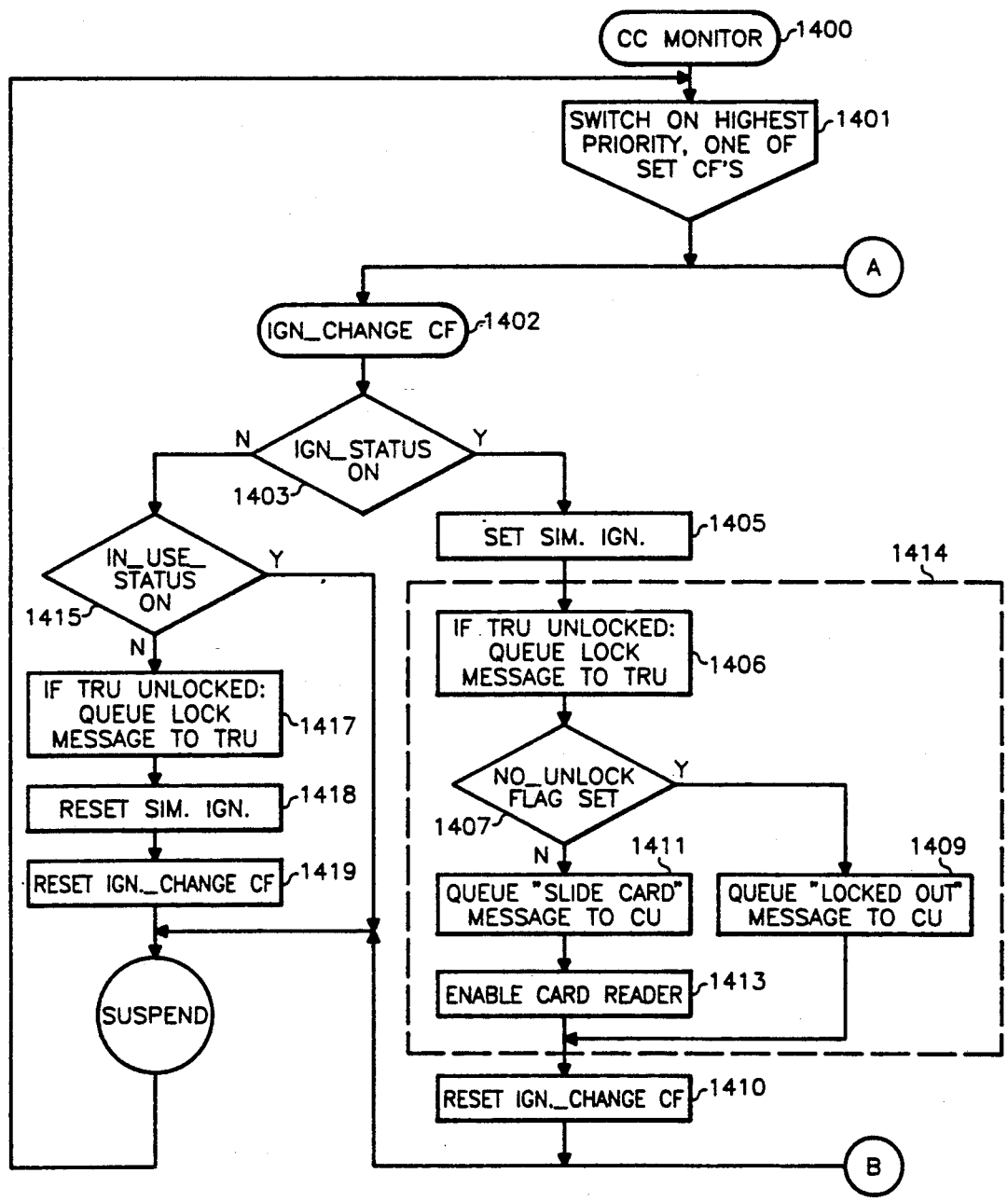
FIGS. 14A-14F together show a flow chart of a credit card (CC) monitor application procedure performed by the RPU portion of the present invention.
Figure 14B:
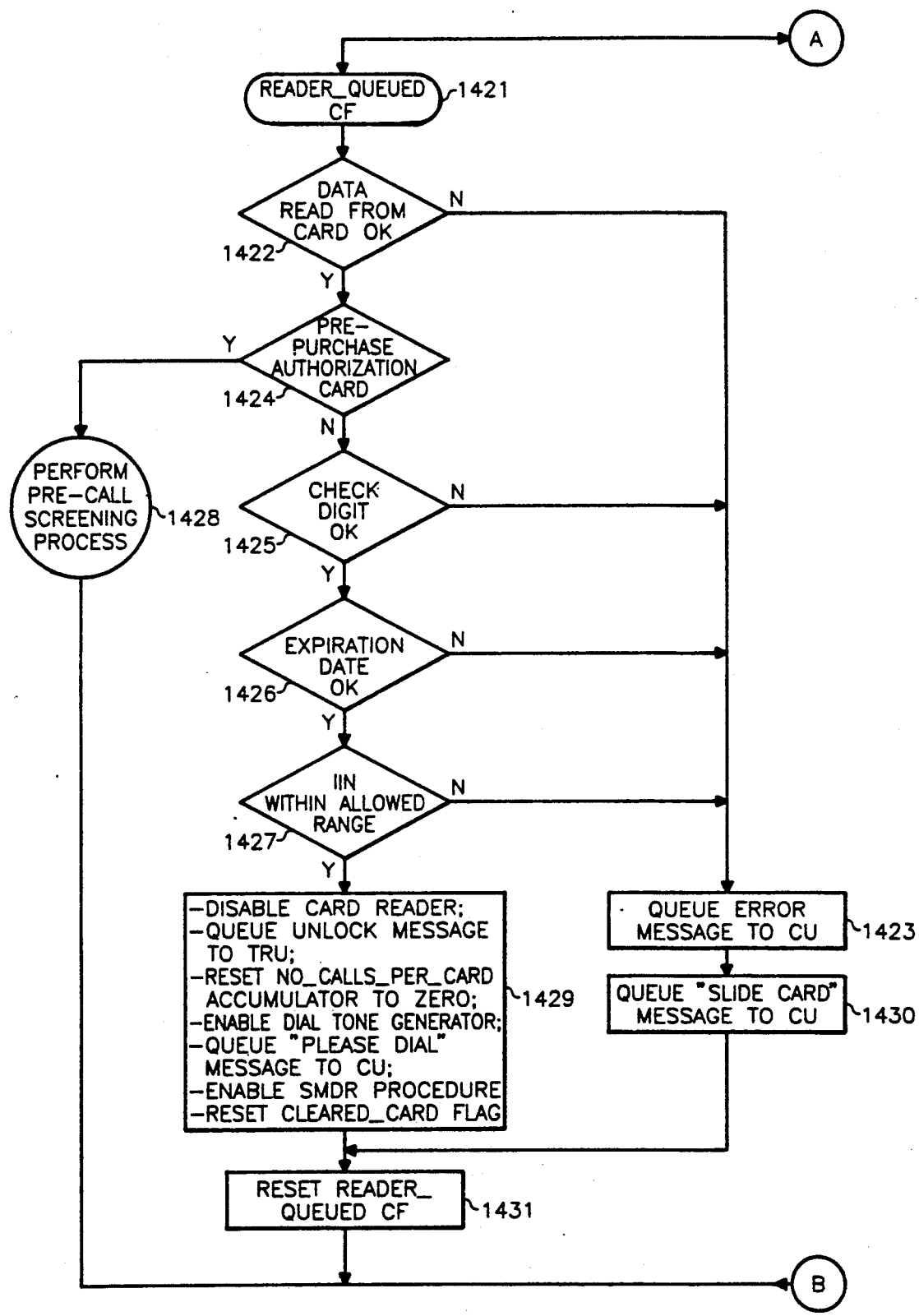
Figure 14C:
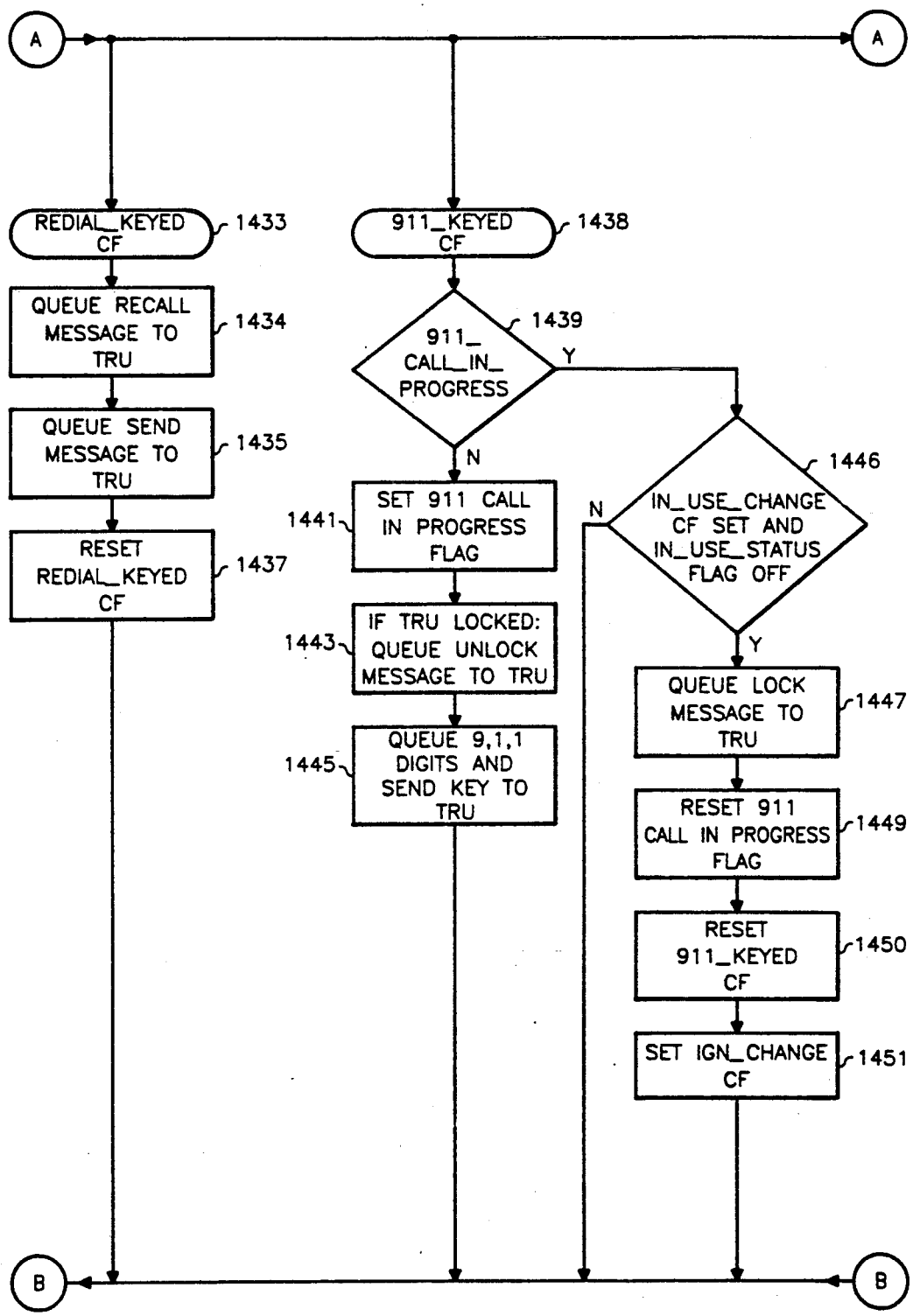
Figure 14D:
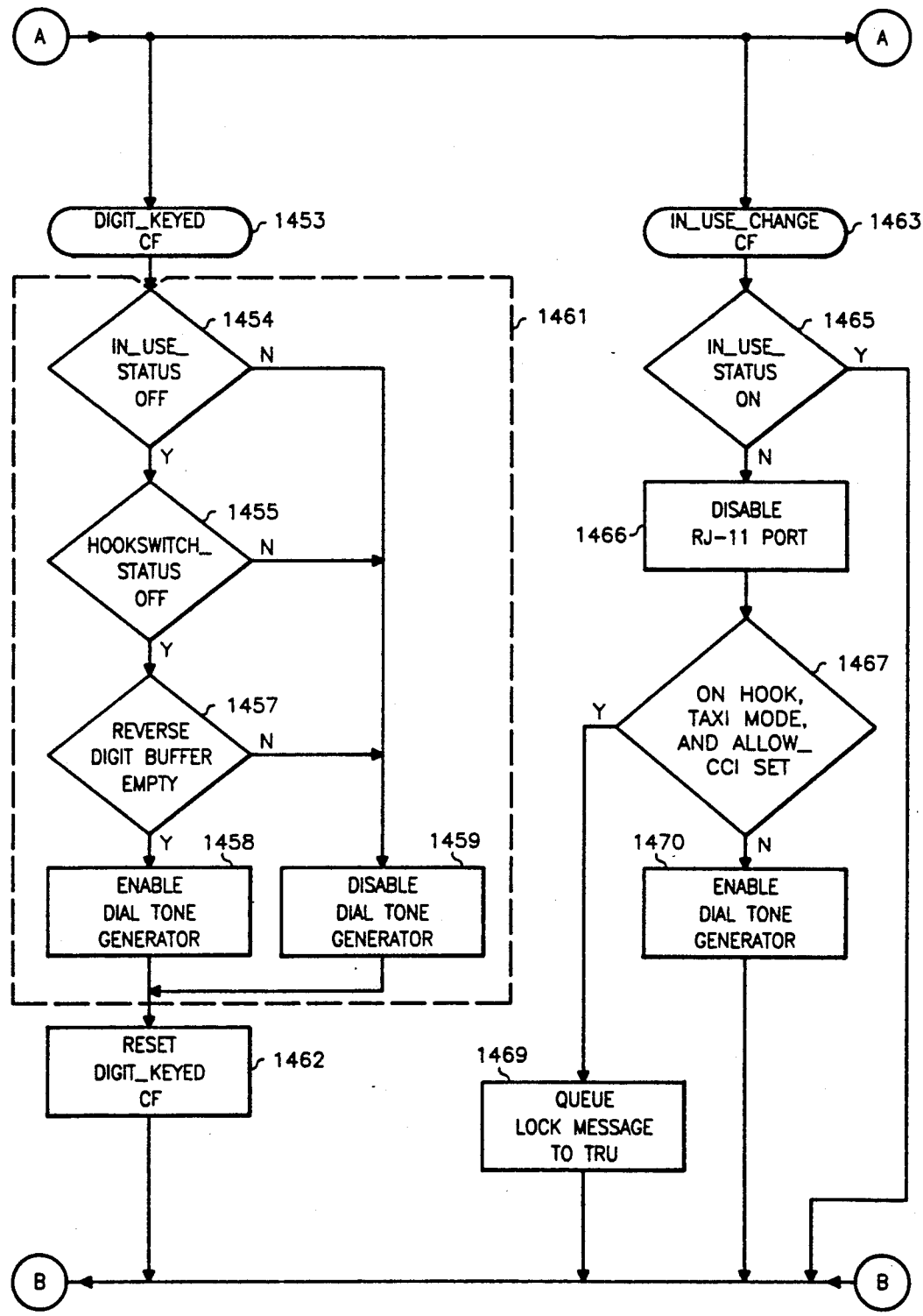
Figure 14E:
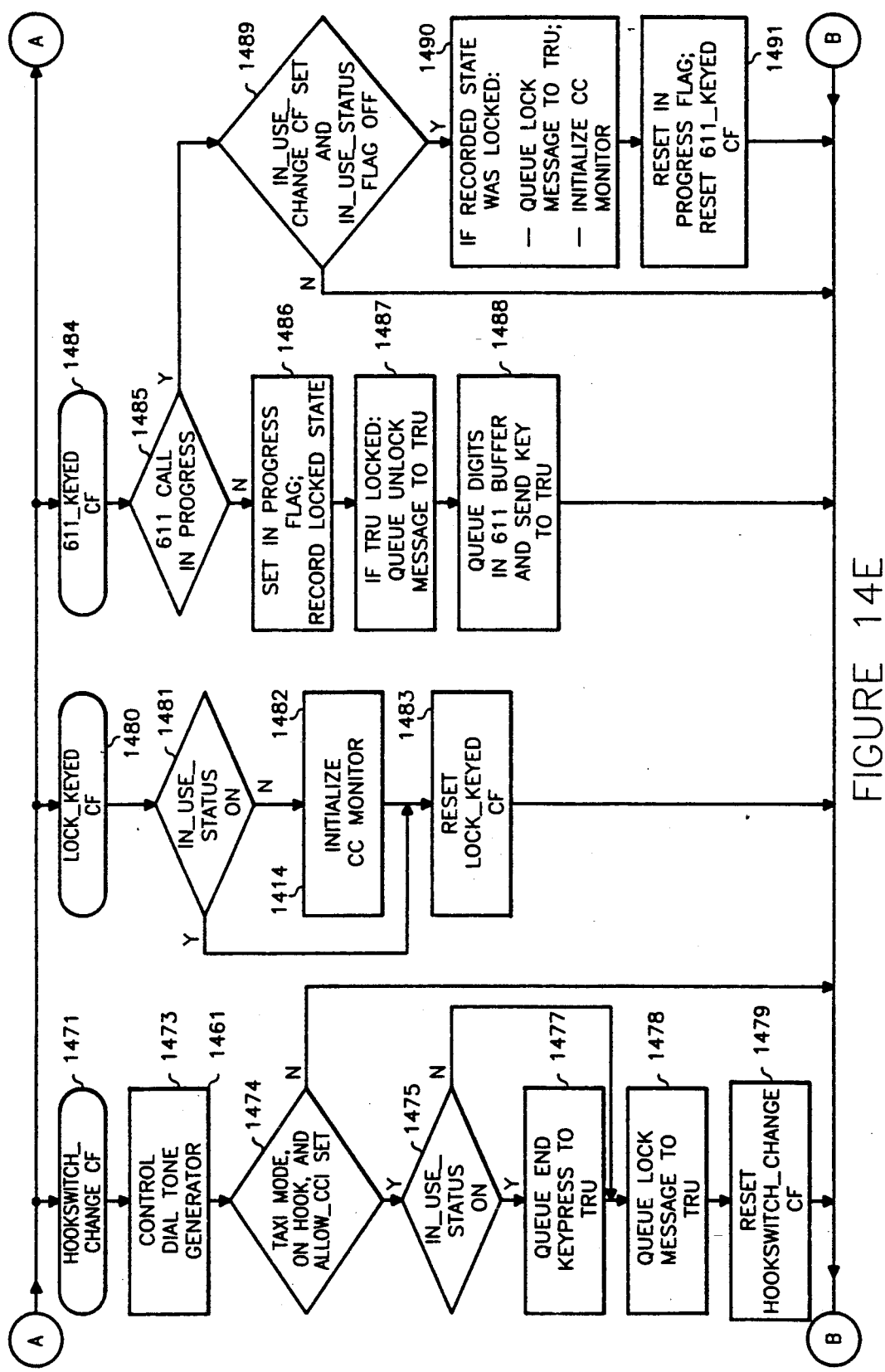
Figure 14F:
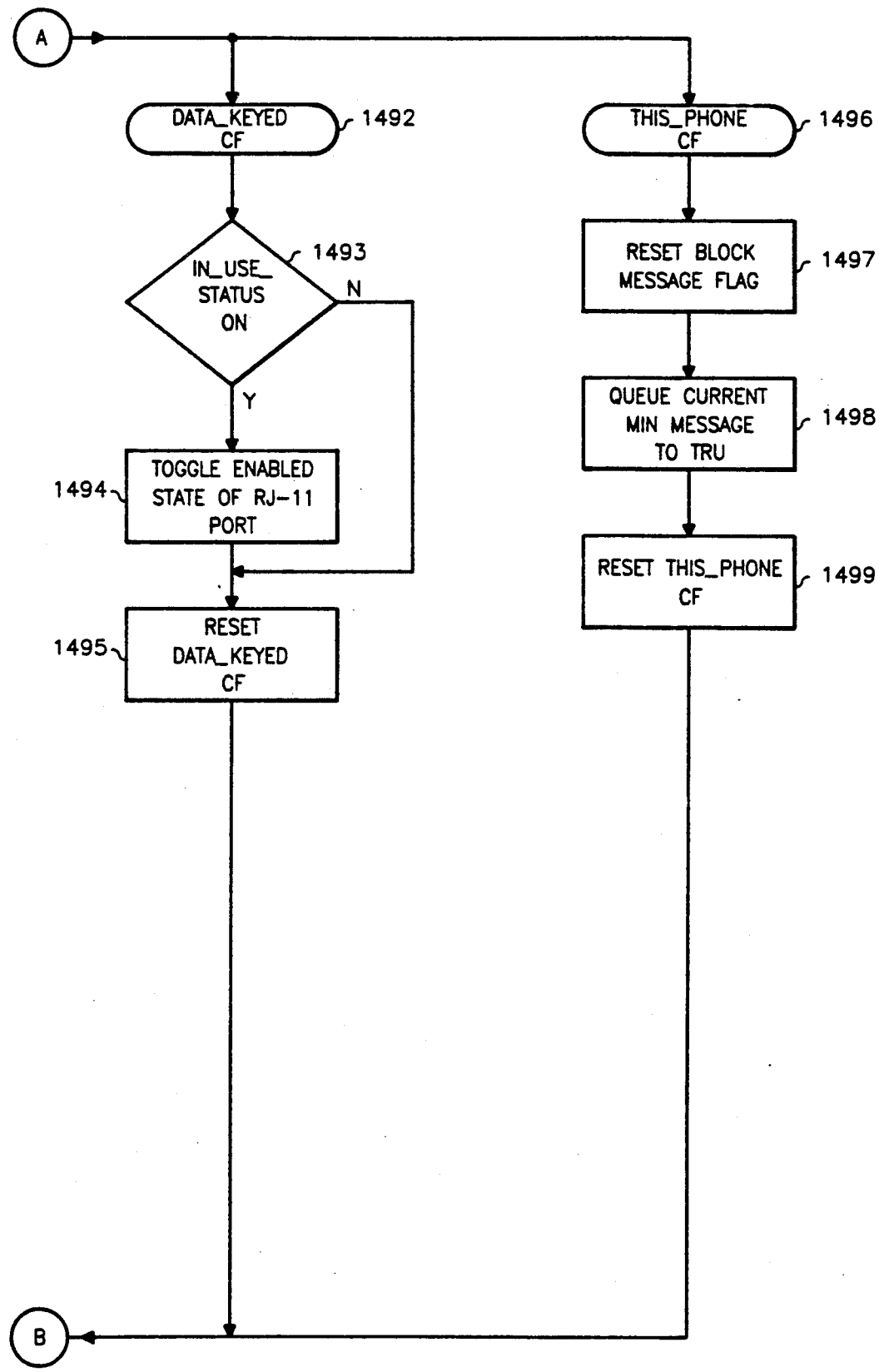

FIG. 13 shows a flow chart of tasks performed within reverse command (RCMD) application procedure 1300. RCMD procedure is performed when a message is received from TRU 62 (see FIG. 2) and processed through background procedure 600, discussed above in connection with FIG. 6. Generally speaking, RCMD procedure 1300 processes data messages traveling from TRU 62 toward CU 42 (see FIG. 2). Based on this processing, data in various buffers and various condition flags are maintained in a current form. In addition, RCMD procedure 1300 decides whether or not to pass such messages on to CU 42. In addition to FIG. 13, TABLE II, presented below, describes the operation of RCMD procedure 1300.

TABLE II

| RCMD Condition | Condition Flag | Pass Message |
|---|---|---|
| Power On Message | POM | N[A] |
| Service Change Message | Service_Change | Y |
| In Use Change Message | In_Use_Change | Y |
| Mode Message | — | Y[B] |
| Data/Digit Message | — | Y[B] |
| Other Message | — | Y |
| Dialed Digits Condition | Digits_Done | — |
| Data Complete Condition | Data_Done | — |

[A]Passed if Allow_CCI flag is reset.
[B]Not passed if Block_Message flag is set.

With reference to FIG. 13 and TABLE II, a task 1302 of RCMD procedure 1300 gets the next message present in its input queue. This message was placed there by the TRU-In background data input procedure discussed above in connection with FIG. 6. Next, an inquiry task 1304 examines this message to determine if it is a mode message. A mode message identifies the type of data to be communicated in subsequent messages. For example, such subsequent messages may communicate dialed digits or other numbers, such as a system identification number (SID) or mobile identification number (MIN). When a mode message is encountered, a task 1306 sets a Mode flag in accordance with the contents of the mode message, and program control proceeds to a task 1308, discussed below.

When task 1304 determines that the message is not a mode message, an inquiry task 1310 determines whether the message represents numeric data, such as an ESN or MIN, or dialed digits. When RCMD procedure 1300 encounters such data or digits, a task 1312 adds, or concatenates, the data or digits to a buffer which is selected in accordance with the Mode flag, discussed above. After task 1312, an inquiry task 1314 further determines whether the data or digits message is an ending message. When task 1314 detects the end of the data or digits, a task 1316 sets the appropriate one of Data—Done or Digits—Done CFs. Whether or not the data/digits message represents an ending message, program control then proceeds to task 1308, discussed below.

Of course, those skilled in the art will recognize that the particular data communication format utilized in the preferred embodiment to transmit numbers, such as dialled digits, SID, MIN, and the like, may be unique to the OKI cellular telephone equipment with which the preferred embodiment of the present invention operates. Nevertheless, other conventional cellular TRU and CU equipment communicate similar numeric information, although data formats may differ. Those skilled in the art will be able to adapt the teaching of the present invention to accommodate the identification of such information, whether or not the above-discussed data format is utilized.

With reference back to task 1310, when the message being processed by RCMD procedure 1300 is not a data/digits message, a task 1318 sets appropriate CFs for the message. TABLE II lists messages for which CFs are set in task 1318 and the names utilized herein to describe such CFs. In addition, a task 1320 sets the condition's status flag appropriately when the message signals a change condition. For example, an In Use Change message represents one change condition. Task 1320 determines whether the new status is "in use" (on) or "not in use" (off). Task 1320 then sets an In—Use— Status flag to indicate the correct "on" or "off" status.

After task 1320, program control proceeds to task 1308. Task 1308 selectively passes the message being processed by this iteration of procedure 1300 toward CU 42. TABLE II lists the messages and conditions which cause task 1308 to pass a message on toward CU 42. Messages are passed to TRU 62 by placing them in an input queue for the CU-Out procedure, discussed above in connection with FIG. 7.

After task 1308, a task 1322 updates the RCMD—Queued CF, which controls the invoking of RCMD procedure 1300. Specifically, when the RCMD input queue is empty, indicating that no more input messages are present for RCMD procedure 1300 to process, the RCMD—Queued CF is reset so that procedure 1300 will not be invoked again until such messages are present. Next, procedure 1300 is suspended and program control returns to executive 800 (see FIG. 8).

FIGS. 14A-14F collectively present a flow chart which describes the operation of credit card (CC) monitor procedure 1400. The connectors labeled "A" and "B" in FIGS. 14 represent common nodes of this flow chart. Generally speaking, procedure 1400 includes several processes which are performed independently of one another. After each of these processes finishes its processing, program control returns to executive 800 (see FIG. 8). The next time program control returns to procedure 1400, either the same or another process is selected for execution. Accordingly, a switching task 1401, shown in FIG. 14A, makes this selection in accordance with a predetermined priority. In the preferred embodiment of the present invention, this priority is indicated from left to right through FIGS. 14, starting with FIG. 14A (on the left) and proceeding to FIG. 14F (on the right).

The highest priority process performed by procedure 1400 results from an ignition change condition. The ignition change condition was detected in background application procedure 1000, discussed above in connection with FIG. 10 and recorded in the Ign—Change CF. Hence, FIG. 14 refer to this process as Ign—Change CF process 1402. An inquiry task 1403 determines whether the ignition status is now "on" or "off". When ignition has recently been turned "on", a task 1405 sets the simulated ignition signal output to TRU 62 to energize TRU 62. Next, a task 1406 queues a lock message for output to TRU 62 when TRU 62 is not already locked. This message is queued by placing an appropriate message in the input queue to the TRU-Out procedure, discussed above in connection with FIG. 700. As a consequence, the TRU-Out procedure will eventually send this message to TRU 62, and TRU 62 will lock itself. Further, TRU 62 will send a "locked" message toward CU 42. Additionally, task 1406 records the locked state of TRU 62.

After task 1406, an inquiry task 1407 determines whether a No—Unlock flag is set. As is discussed below in more detail, the No—Unlock flag is located in nonvolatile memory 72 (see FIG. 3) and can only be reset through a remote programming session. Thus, CMR 12 will be locked to prevent any use of CMR 12, other than emergency calls, and CMR 12 cannot be unlocked until a remote programming session resets the No—Unlock flag so that CMR 12 can be unlocked. When the No—Unlock flag is set, a task 1409 queues an appropriate "Locked Out" message for transmission to CU 42. This message will eventually be sent to CU 42 by the CU-Out procedure discussed above in connection with FIG. 7, and display 38 of CU 42 (see FIG. 2) will then display the message. After task 1409, program control proceeds to a task 1410, discussed below.

When the No—Unlock flag is reset, a task 1411 queues a "Slide Card" message to CU 42. At ignition "on" this message is substituted for the normal welcome message that TRU 62 sends toward CU 42. This message will instruct a pay-service customer to slide his or her credit card through card reader 54 (see FIGS. 2-3) in order to make a call through CMR 12. Next, a task 1413 enables card reader 54 so that data may be received therefrom.

Tasks 1406, 1407, 1409, 1411, and 1413 together serve to initialize the credit card operation of CMR 12, and are collectively referred to as initialization sub-process 1414 in FIGS. 14. As a result of this initialization, TRU 62 is locked, and CMR 12 is prepared to receive a credit card so that a pay-service call may be placed through CMR 12.

After initialization sub-process 1414, task 1410 resets the Ign—Change CF so that no further invocation of process 1402 will occur until the ignition again changes state. After task 1410, process 1402 and CC monitor procedure 1400 suspend operation and program control returns to executive 800 (see FIG. 8).

When the ignition changes to an off state, process 1402 performs an inquiry task 1415. Task 1415 tests the In_Use_Status flag to determine whether CMR 12 is currently being used in placing or making a call. When a call is underway, program control is suspended. Thus, the call may be completed without interruption even when a vehicle's ignition is turned "off" in the middle of a call. However, when the ignition has been turned off and CMR 12 is not in use, a task 1417 then locks TRU 62 if it is not already locked. As discussed above, locking results from queuing an appropriate message to the TRU-Out procedure.

Next, a task 1418 resets the simulated ignition signal to remove power from TRU 62, and a task 1419 resets the Ign_Change CF. The removal of power from TRU 62 conserves vehicle battery power, and the resetting of the Ign_Change CF prevents further invocation of process 1402 until the ignition again changes state. As discussed above, the removal of power from TRU 62 has no effect on the power supplied to microprocessor section 66, memories 70-72, and timer 74 of RPU 48 (see FIG. 3). Hence, RPU 48 continues to perform the method of the present invention. After task 1419, process 1402 and CC monitor procedure 1400 suspend operation and program control returns to executive 800 (see FIG. 8).

A Reader_Queued CF process 1421 of CC monitor procedure 1400 has a lower priority than process 1402. The Reader_Queued CF was set as a result of receiving input data from card reader 54 (see FIGS. 2-3), through the Reader-In procedure discussed above in connection with FIG. 6. An inquiry task 1422 determines whether data was correctly read from credit card 88 (see FIG. 4). The preferred embodiment of the present invention is configured to read data from conventional ABA credit cards. Thus, credit card 88 presents data in a format substantially as shown in FIG. 15. This data format includes numerous parity bits 1502, starting and ending sentinels 1504 and 1506, respectively, and a longitudinal redundancy check (LRC) number 1508. Task 1422 utilizes well known algorithms to verify that parity bits, sentinels, and LRC are all correct. If any one of these items is not correct, then a failure has occurred reading credit card 88, and program control proceeds to a task 1423 (see FIG. 14B), discussed below.

Referring back to FIG. 14B, if task 1422 determines that data was correctly read from credit card 88, an inquiry task 1424 checks the data read from card 88 to identify the institution issuing the card. If the institution is the type of institution that requires pre-authorization of purchases on its cards, then CMR 12 initiates an optional pre-call screening process 1428. Pre-call screening process 1428 may be similar to the pre-call screening processes used in conventional mobile pay service systems. When included, pre-call screening process 1428 allows CMR 12 to accept credit cards 88 from a wide range of credit card issuers. It is activated infrequently because most credit cards 88 do not require pre-authorization. Since pre-call screening process 1428 is expected to be used only infrequently, it has little adverse impact on overall system costs and cellular radio airtime. Moreover, pre-call screening process 1428 may be entirely omitted so long as pay service may be limited to use in connection with credit cards 88 that do not require pre-authorization. After initiating pre-call screening process 1428, process 1421 and CC monitor procedure 1400 suspend operation and program control returns to executive 800 (see FIG. 8).

When task 1424 determines that credit card 88 is not issued by an institute requiring pre-authorization, an inquiry task 1425 determines whether a check digit 1510 (see FIG. 15) encoded on credit card 88 is correct. The check digit confirms the validity of the card's identification number 1512. This determination is made using a well known Luhn formula. If the check digit is incorrect, a problem with credit card 88 has been detected, and program control proceeds to task 1423, discussed below.

If task 1425 verifies check digit 1510, an inquiry task 1426 investigates an expiration date 1514 read from credit card 88. Task 1426 compares the card's expiration date with the internal date counter maintained in timer procedure 500, discussed above in connection with FIG. 5. If the current date is greater than the expiration date, then an expired card has been detected, and program control proceeds to task 1423, discussed below.

Figure 16:
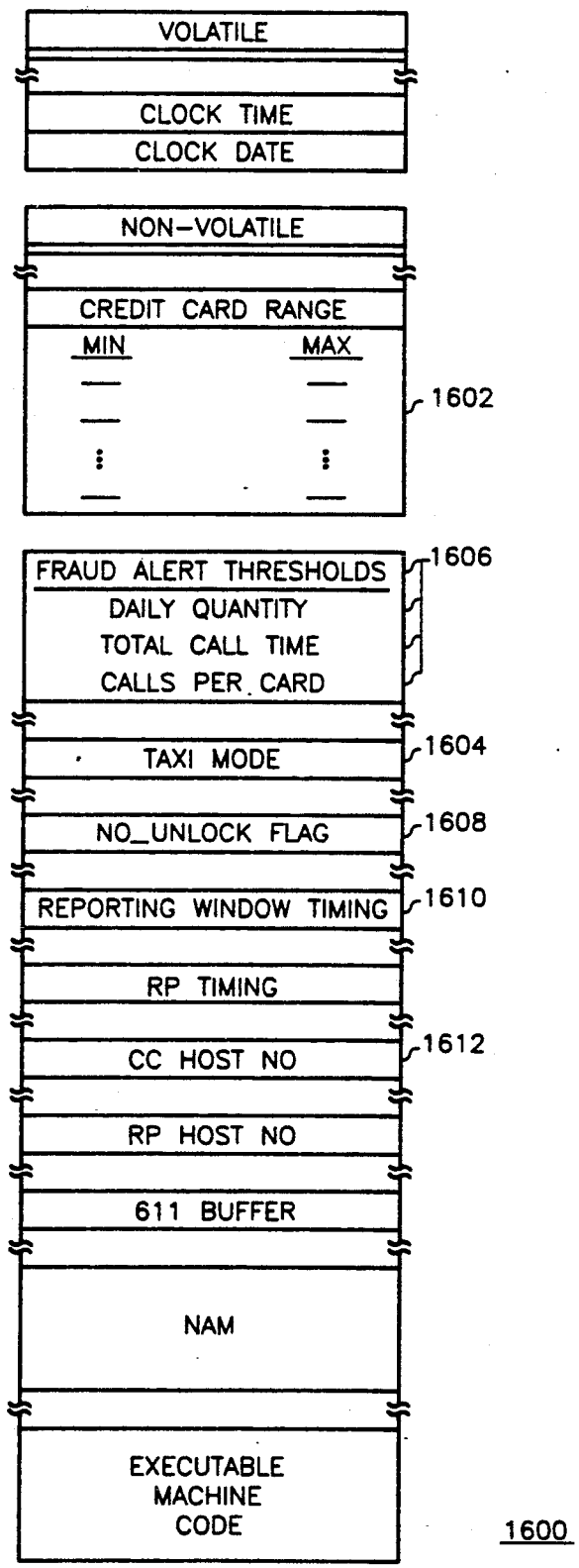
FIG. 16 shows a diagram of data items utilized by the RPU portion of the present invention and programmed during RP sessions.

If task 1426 verifies the expiration date, an inquiry task 1427 determines whether an issuer identification number (IIN) 1516 is within an approved range for issuer identification numbers. FIG. 16 shows portions of a memory map 1600 maintained within memories 70-72 of RPU 48 (see FIG. 3). One of the items stored in a non-volatile portion of memories 70-72 is a credit card range table 1602. Table 1602 is programmed or written using data periodically supplied from RP host 24 (see FIG. 1) during a remote programming session, discussed below in connection with FIG. 21. Through such remote programming sessions, table 1602 is maintained in a relatively current state in accordance with the latest information published from credit card issuers.

Moreover, table 1602 is used to define the issuer credit cards which are accepted by system 10 (see FIG. 1). In particular, table 1602 preferably includes a minimum and a maximum entry for each allowable IIN 1516 (see FIG. 15). The minimum entry defines the lowest IIN allowed for the associated range, and the maximum entry defines the maximum number allowed for the associated range. A wide variety of credit cards, including virtually all ABA cards, may be listed in table 1602 so that pay service is not limited to only a few credit cards that a given authorization host 20 (see FIG. 1) may list in its database. Task 1427 (see FIG. 14B) accesses table 1602 to determine if the IIN read from credit card 88 is covered by the ranges listed in table 1602. If the IIN read from credit card 88 is not included within the ranges listed in table 1602, then an unacceptable credit card has been read, and program control proceeds to task 1423, discussed below.

If task 1427 approves the IIN read from credit card 88, then credit card 88 has been locally validated. The local validation performed in tasks 1422, 1425, 1426, and 1427 is "local" because it does not rely upon a data communication session with authorization host 20 (see FIG. 1) and is performed entirely within CMR 12. Since it is performed entirely within CMR 12, the local validation does not suffer from the expense, customer waiting, and cellular airtime consumption problems which would otherwise be associated with an external validation.

Upon a successful completion of the local validation, a task 1429 enables CMR 12 to be used for making calls. Specifically, task 1429 disables card reader 54 so that noise or other interference from card reader 54 will not degrade operation of CMR 12. Task 1429 also queues an unlock message to TRU 62 so that TRU 62 will unlock itself. A Number__Of__Calls__Per__Card accumulator variable, discussed below, is reset to zero, and dial tone generator 77 (see FIG. 3) is enabled to prompt the customer to key in a telephone number. In addition, an appropriate "Please Dial" message is queued for display at CU 42 to further prompt the customer to key in a telephone number.

Task 1429 also enables SMDR procedure 1700 and resets a Cleared__Card flag. As discussed above, executive 800 (see FIG. 8) will route program control to SMDR procedure 1700 in an appropriate condition (discussed below) now that it has been enabled. The Cleared__Card flag may be represented by a single bit in memory 70 (see FIG. 3). When the Cleared__Card flag is set, as discussed below, a successful external validation of credit card 88 is indicated.

Upon an unsuccessful local validation of credit card 88, program control proceeds to task 1423. Task 1423 queues an appropriate error message for display at CU 42. An appropriate error message may state "Please Try Again" or "Sorry, Access Denied" or the like. Next, a task 1430 queues the "Slide Card" message for display at CU 42. Accordingly, the customer is prompted to retry his or her credit card or to try another credit card 88.

After tasks 1429 or 1430, a task 1431 resets the Reader__Queued CF so that process 1421 will not again be performed until another credit card data message has been read by card reader 54. After task 1431, process 1421 and CC monitor procedure 1400 suspend operation and program 35 control returns to executive 800 (see FIG. 8).

A Redial__Keyed CF process 1433 of CC monitor procedure 1400 has a lower priority than process 1421. The Redial__Keyed CF was set as a result of a customer pressing a "redial" key of CU 42, a resulting redial message being received by the CU-In procedure discussed above in connection with FIG. 6, and the redial message being detected by FCMD procedure 1200 (see FIG. 12). Within process 1433, a task 1434 queues a recall message to TRU 62. This message will cause TRU 62 to recall the previously dialed number that it received and stored in an internal buffer. After task 1434, a task 1435 queues a send message to TRU 62 to cause TRU 62 to place a call to the recalled number. After task 1435, task 1437 resets the Redial__Keyed CF so that process 1433 will not be performed again until the next time the customer presses the redial key of CU 42. After task 1437, process 1433 and CC monitor procedure 1400 suspend operation and program control returns to executive 800 (see FIG. 8).

A 911__Keyed CF process 1438 of CC monitor procedure 1400 has a lower priority than process 1433. The 911__Keyed CF was set as a result a customer dialing "911" plus "send" when TRU 62 is locked, as discussed above in connection with FCMD procedure 1200 (see FIG. 12). Within process 1438, an inquiry task 1439 determines whether a 911 call is currently underway. This determination may be made by examining a 911__Call__In__Progress flag. If a 911 call is not currently underway, a task 1441 sets the 911 Call In Progress flag so that task 1439 will subsequently recognize that the 911 emergency call is in progress. Next, a task 1443 queues an unlock message to TRU 62 so that the 911 call can be placed, and a task 1445 queues "9", "1", "1", and "send" messages to TRU 62. As a result of task 1445, TRU 62 will place the emergency call. After task 1445, process 1438 and CC monitor procedure 1400 suspend operation and program control returns to executive 800 (see FIG. 8). However, at this point the 911__Keyed CF has not been reset, and executive 800 and task 1401 will reroute program control back to process 1438 as soon as possible.

When program control returns to process 1438, task 1439 will now determine that a 911 call is in progress. Next, a task 1446 will test the In__Use__Change CF and In Use Status flag to determine if the usage of CMR 12 has just switched "off". In other words, task 1446 determines if the 911 call has just ended. If the 911 call has not yet ended, process 1438 and CC monitor procedure 1400 are again suspended and program control again returns to executive 800.

When task 1446 eventually detects the end of the 911 call, a task 1447 queues a lock message for transmission to TRU 62 to relock TRU 62. Next, a task 1449 resets the 911__Call__In__Progress flag to indicate the completion of the 911 call, and a task 1450 resets the 911__Keyed CF so that process 1438 will not be performed again until another "locked" 911 call is attempted. After task 1450, a task 1451 sets the Ign__Change CF. The ignition may not necessarily have changed at task 1451. However, task 1451 simulates an ignition change so that Ign__Change CF process 1402, discussed above, will re-initialize credit card operation of CMR 12. This re-initialization will take the state of vehicle ignition into account, as discussed above. After task 1451, process 1438 and CC monitor procedure 1400 suspend operation and program control returns to executive 800 (see FIG. 8).

A Digit__Keyed CF process 1453 of CC monitor procedure 1400 has a lower priority than process 1438. The Digit__Keyed CF was set as a result of a customer pressing a digit key (0-9) of CU 42, a resulting digit keyed message being received by the CU-In procedure discussed above in connection with FIG. 6, and the digit keyed message being detected by FCMD procedure 1200 (see FIG. 2) Within process 1453, inquiry tasks 1454, 1455, and 1457 test the In__Use__Status flag, the Hookswitch__Status flag, and the reverse digits buffer. When CMR 12 is not currently in use, is off hook, and the reverse digits buffer is empty, a task 1458 enables dial tone generator 77 (see FIG. 3). Otherwise, a task 1459 disables dial tone generator 77. Together, tasks 1454-1459 serve as a control dial tone sub-process 1461. As a result of subprocess 1461, a dial tone is generated to inform the customer that a phone number may be dialled. However, as soon as any digits are dialled, the dial tone is removed. After sub-process 1461, a task 1462 resets the Digit__Keyed CF so that process 1453 will not be performed again until the next digit is keyed at CU 42. After task 1462, process 1453 and CC monitor procedure 1400 suspend operation and program control returns to executive 800 (see FIG. 8).

An In__Use__Change CF process 1463 of CC monitor procedure 1400 has a lower priority than process 1453. The In__Use__Change CF was set in a previous run of RCMD procedure 1300 when an in use change message from TRU 62 was detected. Within process 1463, an inquiry task 1465 determines whether the change in usage is to an "on" or "off" state by testing the In__Use__Status flag. If the change indicates an in use condition, then process 1463 and CC monitor procedure 1400 suspend operation and program control returns to executive 800 (see FIG. 8).

On the other hand, if the change indicates an out-of-use condition, a task 1466 forces RJ11 port 79 (see FIG. 3) into a disabled state to return the data communications port of CMR 12 to an initialized state after a call is completed. Nothing requires RJ11 port 79 to have been enabled at task 1466, but task 1466 disables port 79 regardless of its prior state. After task 1466, an inquiry task 1467 examines the Hookswitch_Status flag, the Allow_CCI flag, and a Taxi_Mode flag. The Hookswitch_Status and Allow_CCI flags are discussed above.

The Taxi_Mode flag resides in a non-volatile portion of memory 72, as shown at data element 1604 of FIG. 16. The Taxi_Mode flag is set or reset by a remote programming session to instruct CMR 12 whether to operate in a taxi mode. In the taxi mode, CMR 12 serves as a credit card paystation in which a credit card must be swipped through card reader 54 (See FIGS. 2-3) and validated prior to making each call. On the other hand, in a normal credit card paystation mode of operation, such as that anticipated for use in rental cars, many calls may be made after a swipping and validating a single credit card. When task 1467 detects the taxi mode of operation, an on-hook condition, and the credit card mode of operation, a task 1469 queues a lock message to TRU 62 to force RPU 48 to require credit card validation before making another call. On the other hand, when task 1467 does not detect the taxi mode of operation and other conditions, a task 1470 enables dial tone generator 77 to inform the customer that CMR 12 will accept another phone number.

After tasks 1469 or 1470, process 1463 and CC monitor procedure 1400 suspend operation and program control returns to executive 800 (see FIG. 8). Process 1463 does not disable the In_Use_Change flag because this flag is also used to invoke SMDR procedure 1700, as discussed below. It is SMDR procedure 1700 that controls the state of the In_Use_Change flag.

A Hookswitch Change CF process 1471 of CC monitor procedure 1400 has a lower priority than process 1463. The Hookswitch_Change CF was set as a result of removing or inserting handset 30 into cradle 36 (see FIG. 2) of CU 42. As a result of this action, a hook switch change message was sent from CU 42 to RPU 48 and received by the CU-In procedure discussed above in connection with FIG. 6. This message was detected by FCMD procedure 1200 (see FIG. 12).

Within process 1471, a task 1473 performs the control dial tone sub-process 1461, discussed above in connection with process 1453. After dial tone has been properly set or removed, an inquiry task 1474 examines the Taxi₁₃ Mode, Hookswitch_Status, and Allow_CCI flags. When CMR 12 is operating in the credit card, taxi mode and the handset is on-hook, program control proceeds to an inquiry task 1475. When any one of the conditions examined in task 1474 are not true, process 1471 and CC monitor procedure 1400 suspend operation and program control returns to executive 800 (see FIG. 8).

Task 1475 examines the In_Use_Status flag to see if CMR 12 is currently in use. When CMR 12 is in use, a task 477 queues an "end" keypress to TRU 62 to drop any current call through CMR 12. Regardless of whether CMR 12 is in use, a task 1478 then queues the lock message to TRU 62 to force another credit card validation to take place before making another call. After task 1478, a task 1479 resets the Hookswitch_Change CF so that procedure 1471 will not be repeated until the next change in hook switch status occurs. After task 1479, process 1471 and CC monitor procedure 1400 suspend operation and program control returns to executive 800 (see FIG. 8).

A Lock_Keyed CF process 1480 of CC monitor procedure 1400 has a lower priority than process 1471. The Lock_Keyed CF was set as a result of a customer pressing a "lock" key of CU 42, a resulting lock keyed message being received by the CU-In procedure discussed above in connection with FIG. 6, and the lock keyed message being detected by FCMD procedure 1200 (see FIG. 12). Within process 1480, an inquiry task 1481 examines the In_Use_Status flag to determine if CMR 12 is currently in use. If CMR 12 is not in use, a task 1482 initializes CC monitor procedure 1400 by performing sub-process 1414, discussed above in connection with process 1402. When CMR 12 is in use, task 1482 is not performed. As a result, a lock key activation which occurs during a call is simply ignored. Regardless of whether CMR 12 is in use, process 1480 next performs a task 1483, which resets the Lock_Keyed CF. The resetting of the Lock Keyed CF prevents further performance of process 1480 until the next time that the lock key is pressed. After task 1483, process 1480 and CC monitor procedure 1400 suspend operation and program control returns to executive 800 (see FIG. 8).

A 611_Keyed CF process 1484 of CC monitor procedure 1400 has a lower priority than process 1480. The 611_Keyed CF was set as a result of a customer dialing "611" plus "send", as discussed above in connection with FCMD procedure 1200 (see FIG. 12). Within process 1484, an inquiry task 1485 determines whether a 611 call is currently underway. This determination may be made by examining a 611_Call_In_Progress flag. If a 611 call is not currently underway, a task 1486 sets the 611_Call_In_Progress flag so that task 1439 will subsequently recognize that the 611 emergency call is in progress. In addition, task 1486 records the locked/unlocked state of TRU 62. Next, a task 1487 queues an unlock message to TRU 62 if TRU 62 is currently locked so that the 611 call can be placed in spite of TRU 62 being originally locked.

Next, a task 1488 queues the digits contained in a 611 buffer and "send" messages to TRU 62. The 611 buffer is programmed into non-volatile memory 72 (see FIG. 3) by a remote programming session. Consequently, any phone number can be used, and this number changes as needs arise. Preferably, in a rental car application this number is the number of the rental agency, and it may be used by customers to report vehicle emergencies, such as a vehicle break-down. As a result of task 1488, TRU 62 will place the emergency call. After task 1488, process 1484 and CC monitor procedure 1400 suspend operation and program control returns to executive 800 (see FIG. 8). However, at this point the 611_Keyed CF has not been reset, and executive 800 and task 1401 will reroute program control back to process 1484 as soon as possible.

When program control returns to process 1484, task 485 will now determine that a 611 call is in progress. Next, a task 1489 will test the In_Use_Change CF and In_Use_Status flag to determine if the usage of CMR 12 has just switched off. In other words, task 1489 determines if the 611 call has just ended. If the call has not just ended, process 1484 and CC monitor procedure

1400 are suspended and program control again returns to executive 800.

When task 1489 eventually detects the end of the 611 call, a task 1490 examines the locked/unlocked status previously recorded during task 1486. If CMR 12 had been previously locked, task 1490 queues a lock message to TRU 10 62 and initializes CC monitor procedure 1400 by performing sub-process 1414, discussed above. After task 1490, a task 1491 resets the 611—Call—In— Progress flag to indicate the completion of the 611 call and the 611—Keyed CF so that process 1484 will not be performed again until another 611 call is attempted. After task 1491, process 1484 and CC monitor procedure 1400 suspend operation and program control returns to executive 800 (see FIG. 8).

A Data—Keyed CF process 1492 of CC monitor procedure 1400 has a lower priority than process 1484. The Data—Keyed CF was set as a result of a customer pressing a "data" key of CU 42, a resulting data keyed message being received by the CU-In procedure discussed above in connection with FIG. 6, and the data keyed message being detected by FCMD procedure 1200 (see FIG. 12). Within process 1492, an inquiry task 1493 examines the In—Use—Status flag to determine if CMR 12 is currently in use. If CMR 12 is currently in use, a task 1494 toggles the enabled state of RJ11 port 79 (see FIG. 3). In other words, if RJ11 port 79 was previously enabled, task 1494 will disable it; and, if RJII port 79 was previously disabled, task 1494 will enable it. Regardless of whether CMR 12 is in use, a task 1495 resets the Data—Keyed CF so that process 1492 will not be performed again until the next time that the data key is pressed. After task 1495, process 1492 and CC monitor procedure 1400 suspend operation and program control returns to executive 800 (see FIG. 8).

A This—Phone CF process 1496 of CC monitor procedure 1400 has a lower priority than process 1492. The This—Phone CF was set as a result of a customer pressing a "This Telephone Number" key of CU 42, a resulting this phone message being received by the CU-In procedure discussed above in connection with FIG. 6, and the this phone message being detected by FCMD procedure 1200 (see FIG. 12). Within process 1496, a task 1497 resets the Block—Message flag so that RCMD procedure 1300 will pass digits it receives from TRU 62 on to CU 42. After task 1497, a task 1498 queues a current MIN message to TRU 62. As a result, TRU 62 will send the digits of the MIN of the current number assignment module (NAM) back toward CU 42. These digits will be intercepted by RCMD procedure 1300 and passed on to CU 42, where they will be displayed. Thus, a customer may learn the telephone number associated with CMR 12. After task 1498, a task 1499 resets the This—Phone CF so that process 1496 will not be performed again until the next time the "This Telephone Number" key of CU 42 is pressed. After task 1499, process 1496 and CC monitor procedure 1400 suspend operation and program control returns to executive 800 (see FIG. 8).

As discussed above in connection with process 1421 of procedure 1400, station monitor detail recording (SMDR) procedure 1700 is enabled after credit card 88 (see FIG. 4) has undergone a successful local validation and CMR 12 is in a condition to accept a phone number from the customer. Once SMDR procedure 1700 is enabled, executive 800 (see FIG. 8) routes program control to SMDR procedure 1700 whenever the In—Use—Change CF is set. Thus, SMDR procedure 1700 is invoked at the beginning and end of every attempted call.

Figure 17A:
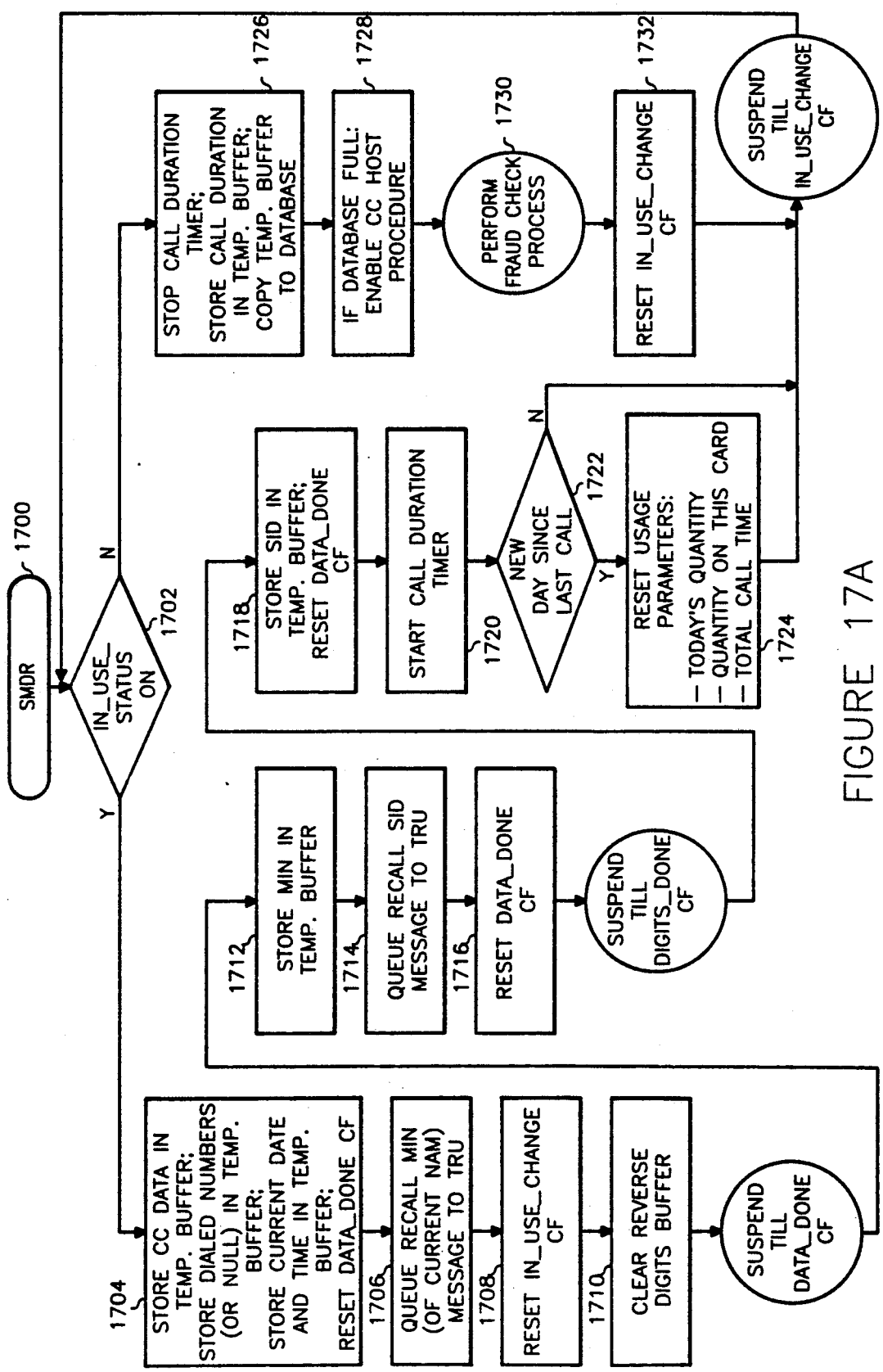
FIGS. 17A-17B together show a flow chart of a station monitor detail recording (SMDR) application procedure performed by the RPU portion of the present invention.
Figure 17B:
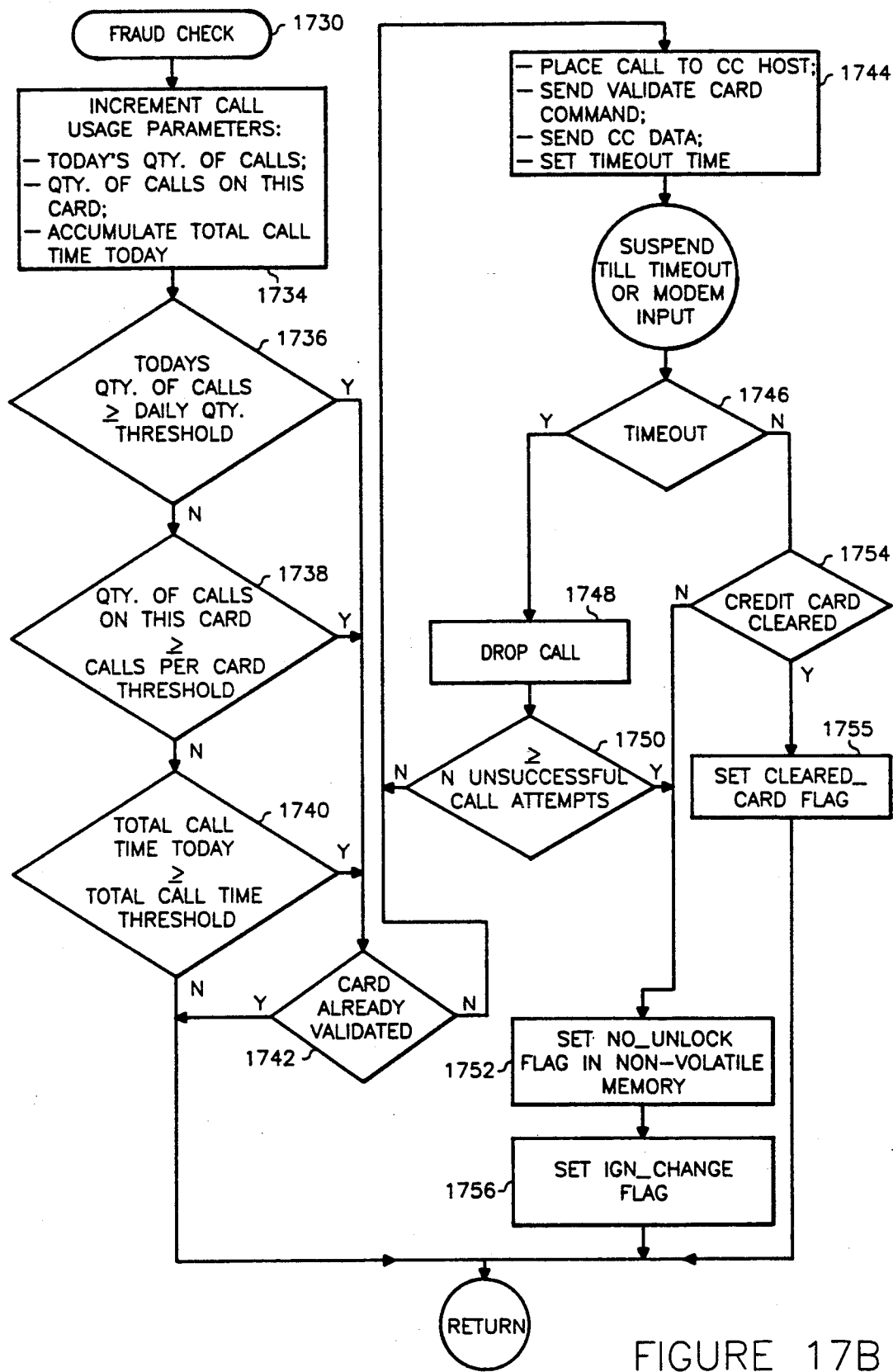

FIGS. 17A and 17B together show a flow chart of tasks performed by SMDR procedure 1700. As shown in FIG. 17A, an inquiry task 1702 initially examines the In—Use—Status flag to determine whether SMDR procedure 1700 is being invoked because of the beginning or end of a call. At the beginning of a call, a task 1704 stores the data read from credit card 88, the dialed numbers (if any), the current date, and the current time in a temporary buffer. The dialed numbers are retained in a digits buffer maintained by RCMD procedure 1300 (see FIG. 13); but, when an incoming call occurs, the dialed digits buffer is empty, and task 1704 stores a null in their place. The date and time are maintained by timer procedure 500 (see FIG. 5). In addition, task 1704 resets the Data—Done CF, which indicates the completion of number message strings received at RCMD procedure 1300.

Next, a task 1706 queues a recall MIN command to TRU 62 to force TRU 62 to send the MIN of the current NAM to RPU 48. After task 1706, a task 1708 resets the In—Use—Change CF, and a task 1710 clears the reverse digits buffer. The clearing of the In—Use— Change CF controls the program flow between procedures, and the clearing of the reverse digits buffer will be used to signal the need for applying a dial tone at the completion of the call. After task 1710, procedure 1700 suspends operation and program control returns to executive 800 (see FIG. 8). Executive 800 routes program control back to SMDR procedure 1700 when the Data—Done CF becomes set through the operation of RCMD procedure 1300 (see FIG. 13).

The return of control to SMDR procedure 1700 causes a task 1712 to add the MIN recalled from TRU 62 to the temporary buffer. Next, a task 1714 queues a recall system identification number (SID) message to TRU 62. This message will force TRU 62 to send the SID of the cellular system that is being used in making the call to RPU 48. Task 1716 resets the Data—Done CF so that operation may be suspended until the SID is received at RPU 48. After task 1716, procedure 1700 suspends operation and program control returns to executive 800 (see FIG. 8). Executive 800 routes program control back to SMDR procedure 1700 when the Data—Done CF again becomes set through the operation of RCMD procedure 1300 (see FIG. 13). This time the setting of the Data—Done CF indicates the presence of the requested SID.

The return of control to SMDR procedure 1700 causes a task 1718 to add the SID recalled from TRU 62 to the temporary buffer and to again reset the Data— Done CF. After task 1718, a task 1720 starts a call duration timer. This timer keeps track of the time that transpires after task 1720 and is maintained by timer procedure 500 (see FIG. 5).

Next, an inquiry task 1722 determines whether a new day has begun since SMDR procedure 1700 was last performed. If so, a task 1724 resets various usage parameters. The usage parameters reset in task 1724 generally record the usage seen by CMR 12 in any given day. These parameters are used in a fraud check process 1900, discussed below, to determine whether to perform additional credit card validation. Specifically, task 1724 clears variables used to record the quantity of calls made each day, the quantity of calls made on any one credit card, and the total call time accrued in any one day. After task 1724 or when task 1722 determines that a new day has not begun, procedure 1700 suspends operation and program control returns to executive 800 (see FIG. 8).

Executive 800 routes program control back to SMDR procedure 1700 the next time that the In_Use_Change CF is set. The In_Use_Change CF gets set upon the completion of a call, and task 1702 detects the end-of-call situation and routes program control to a task 1726. Task 1726 stops the call duration timer previously started in task 1720. In addition, task 1726 stores the accrued call duration (in seconds) in the temporary buffer. At this point, the temporary buffer contains an entire call record, and task 1726 writes this call record to a database maintained within memory 70 (see FIG. 3).

After task 1726, a task 1728 examines this database and enables CC host procedure 1800 if the memory space allocated to the database is used up storing call records. In the preferred embodiment, sufficient memory space is allocated to the database so that around 100 call records may be stored therein. Hence, only on very rare occasions will task 1728 find that the database memory space is totally consumed In accordance with the enabling of CC host procedure 1800, executive 800 (see FIGS. 8–9) will invoke CC host procedure 1800 as soon as possible. As discussed below in connection with FIG. 18, CC host procedure 1800 places a call to CC host 26 (See FIG. 1) to upload the call records stored in the database so that database memory space is freed up for new call records. Since this system call to CC host 26 occurs after completion of a customer's call, it often does not cause a customer to wait as occurs when system calls are placed immediately prior to a customer call.

After task 1728, SMDR procedure 1700 performs fraud check process 1730, which is discussed below in connection with FIG. 17B. After completion of fraud check process 1730, a task 1732 resets the In_Use_Change CF so that SMDR procedure 1700 will not be invoked again until the next time the In_Use_Change CF is set. After task 1732, SMDR procedure 1700 suspends operation and program control returns to executive 800 (see FIG. 8). When program control again returns to SMDR procedure 1700, task 1702 is performed.

FIG. 17B shows a flow chart of fraud check process 1730. Generally, after completion of every call, fraud check process 1730 compares the daily usage of CMR 12 against predetermined fraud alert thresholds. When a fraud alert threshold is exceeded, a call is placed to CC host 26 (see FIG. 1) so that CC host 26 may communicate with authorization host 20 (see FIG. 1) to perform an external validation of credit card 88 (see FIG. 4). Thus, CMR 12 utilizes an external validation procedure only after a CMR 12 is receiving an unusually large amount of customer usage. This unusually large amount of customer usage is an indication of potential credit card fraud, which system 10 automatically protects itself against. At the same time, this unusually large amount of customer usage is directly proportional to the potential payment losses that system 10 (see System) may suffer if the credit card upon which the calls are made is not honored by the credit card issuer. Thus, in this situation an external credit card validation places an upper limit on the payment loss risks faced by system 10.

With reference to FIG. 17B, a task 1734 increments the call usage parameters discussed above in connection with task 1724 of FIG. 17A. Specifically, the quantity of calls made today is incremented by one, the number of calls placed on the currently used credit card is incremented by one, and the total call time is incremented by the call duration of the previous call. Next, inquiry tasks 1736, 1738, and 1740 compare these parameters against fraud alert thresholds. These fraud alert thresholds are values programmed into non-volatile memory 72 (see FIG. 3) through a remote programming session, as shown at data elements 1606 in FIG. 16. Thus, they may be altered as needed and customized for various areas of the geographic region served by system 10 (see FIG. 1). If the number of calls established through CMR 12 in the current day exceeds a daily quantity threshold, if the number of calls placed on the current credit card exceeds a calls per card threshold, or if the total call time accumulated in the current day exceeds a total call time threshold, program control proceeds to an inquiry task 1742. On the other hand, if none of these thresholds has been exceeded, program control exits process 1730 to task 1732 (see FIG. 17A). Of course, those skilled in the art may devise alternate or additional threshold parameters. For example, tasks 1736–1740 may test the total call time accumulated on the current credit card or the total call time since a previous downloading of call data to CC host 26 (see FIG. 1) rather than daily.

Task 1742 examines the Cleared_Card flag to determine if the credit card has previously been externally validated. If the credit card has already been externally validated, then program control exits process 1730 to task 1732 (see FIG. 17A). Thus, once a credit card has been externally validated, CMR 12 permits any amount of CMR 12 usage to accrue to that credit card without further external validation or other action.

However, if the credit card has not already been externally validated, a task 1744 automatically places a call to CC host 26. When a call is established and a data communication link set up, task 1744 sends a validate card command to CC host 26 so that CC host 26 knows the purpose of the system call. Next, task 1744 causes RPU 48 to send the information read from credit card 88 to CC host 26 and to set an appropriate timeout timer. After task 1744, process 1730 suspends operation until either the timeout timer expires or until modem input data is received from CC host 26.

While process 1730 is suspended, CC host 26 places a call to authorization host 20, reformats the credit card information if necessary, and sends the credit card information to authorization host 20. This activity on the part of CC host 26 preferably occurs without dropping the call between CMR 12 and CC host 26. When CC host 26 receives a validation response back from authorization host 20, CC host 26 reformats this response if necessary and passes it back to CMR 12. The data passed to CMR 12 is preferably a "go"/"no go" indication, which can be transmitted quickly. No authorization codes or credit card identification data is passed back to CMR 12. As discussed above, the use of CC host 26 to buffer calls between CMRs 12 and authorization host 20 enhances the security of system 10 while accommodating flexibility in selecting an authorization host 20 with which to communicate. CC host 26 may place calls to different authorization hosts 20 depending on the issuer of the credit card being externally validated, and the hosts 20 may change from time to time without reprogramming CMRs 12.

Process 1730 resumes when either the timeout timer expires or data is received from CC host 26. Upon resumption of process 1730, an inquiry task 1746 determines whether a timeout occurred or data was received from CC host 26. When a timeout occurs, a task 1748 drops the call with CC host 26, and an inquiry task 1750 determines whether a predetermined number of unsuccessful calls have already been placed with CC host 26. So long as this predetermined number has not been exceeded, program control returns to task 1744 to repeat the call to CC host 26. However, when the predetermined number has been exceeded, program control proceeds to a task 1752, discussed below.

When task 1746 determines that data has been received back from CC host 26, an inquiry task 1754 examines this data, which is preferably a "go"/"no go" indication, to determine if authorization host 20 has validated or cleared the credit card. When authorization host 20 externally validates the credit card, a task 1755 sets the Cleared_Card flag to record a successful external validation. After task 1755, process 1730 exits back to task 1732 (see FIG. 17A). However, when authorization host 20 does not clear or validate the credit card, program control proceeds to task 1752.

At task 1752, the method of the present invention has determined that CMR 12 should be disabled so as to be unusable for further customer calls, other than 911 and 611 emergency calls. Accordingly, task 1752 sets the No_Unlock flag in non-volatile memory 72, as shown at data element 1608 in FIG. 16. The No_Unlock flag may be implemented using a single bit of memory 72. No record is made of identifying information from the credit card that was externally invalidated. As discussed above in connection with task 1407 (see FIG. 14A), the setting of this flag takes CMR 12 out of service until a remote programming session resets the No_Unlock flag. In other words, no credit card, whether the offending invalidated credit card or another credit card, may be used in placing a pay service call until the No_Unlock flag is reset. This restriction is imposed because system 10 (see FIG. 1) assumes a high likelihood of fraud in connection with other credit cards once fraud in connection with a first credit card has been detected. After task 1752, a task 1756 sets the Ign_Change CF to simulate an ignition change. As a result, the credit card operation of CMR 12 will be re-initialized in a locked-out mode of operation. After task 1754, program control exits process 1730 and returns to task 1732 (see FIG. 17A).

With reference to FIG. 1, in the preferred embodiment when a credit card has been externally invalidated, CC host 26 automatically engages in data communication with RP host 24. This data communication identifies the CMR 12 that is being taken out of service due to an externally invalidated credit card. Thus, RP host 24 can direct a remote programming session to the identified CMR 12 at a later time.

As discussed above in connection with background application procedure 1000 (see FIG. 10) and with SMDR procedure 1700 (see FIG. 17A), CC host procedure 1800 is enabled either during predetermined off-peak reporting windows (see FIG. 11) or when the internal call record database for CMR 12 is full of call records. As a result of being enabled, executive 800 (see FIGS. 8-9) routes program control to CC host procedure 1800.

Figure 18:
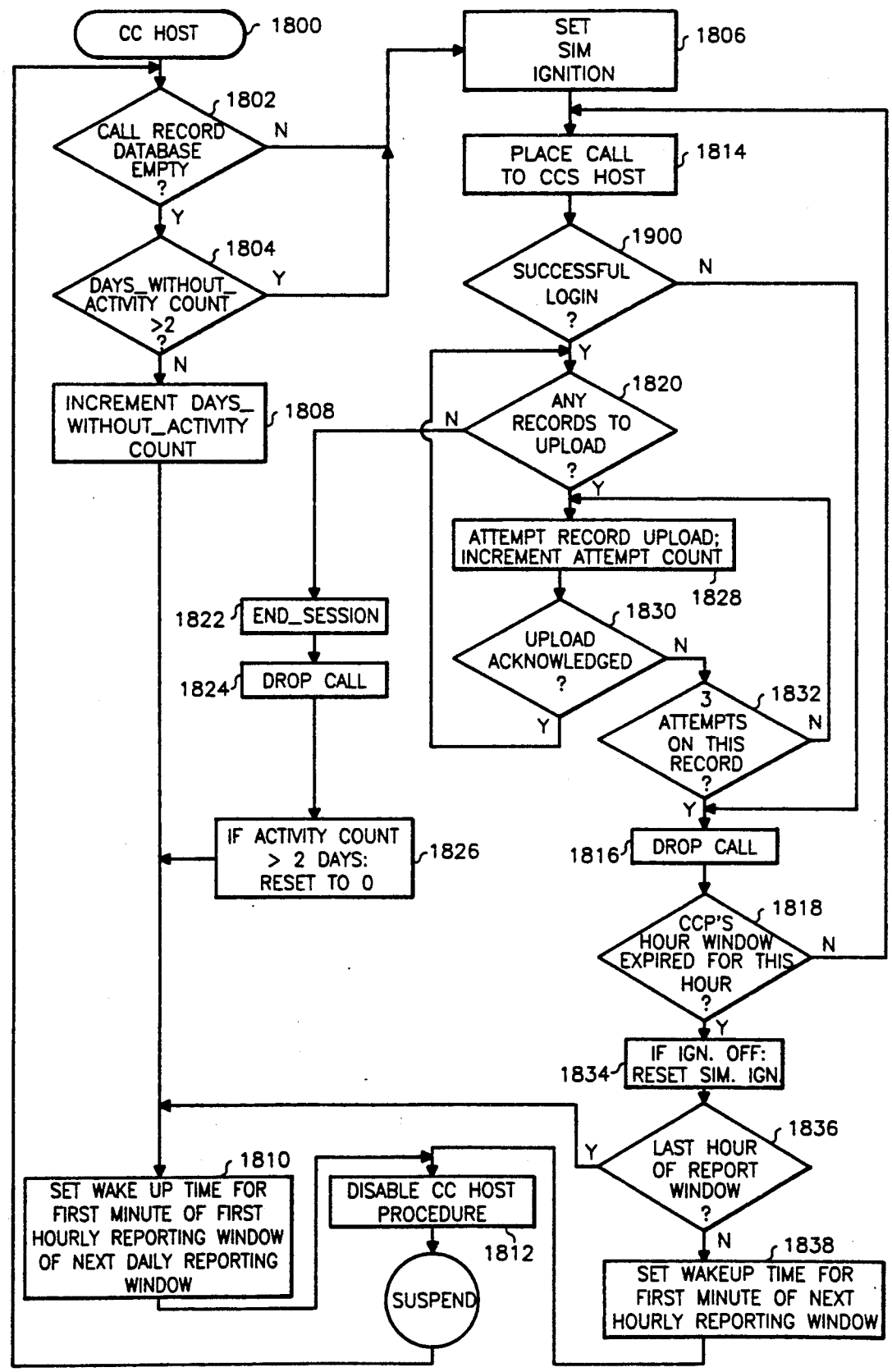
FIG. 18 shows a flow chart of a credit card (CC) host application procedure performed by the RPU portion of the present invention.

FIG. 18 shows a flow chart of tasks performed during CC host procedure 1800. Initially, an inquiry task 1802 determines whether the call record database discussed above in connection with SMDR procedure 1700 (see FIG. 17) is empty. If this data base is empty, then an inquiry task 1804 determines whether more than two days have passed without any call activity at CMR 12. In other words, task 1804 determines whether CMR 12 has just experienced at least three days in which no calls were either made or received. If task 1802 finds a non-empty database or if task 1804 determines that three days without call activity have transpired, then program control proceeds to a task 1806, discussed below.

On the other hand, if the database is empty and two or fewer days have transpired without call activity, then a task 1808 increments the variable that keeps track of the number of days without call activity. After task 1808, a task 1810 adjusts wake-up timing for procedure 1800 to the first minute of the hourly reporting window for the next daily reporting window. The daily and hourly reporting windows are described above in connection with FIG. 11. Data defining the daily reporting window is preferably obtained from non-volatile memory 72 (see FIG. 2), as shown at data element 1610 in FIG. 16, where it was written during a remote programming session. Next, a task 1812 disables CC host procedure 1800 so that it will not be invoked until the above-discussed conditions occur again. In particular, background application procedure 1000 (see FIG. 10) will monitor the current time until the current time matches the wake-up time, then enable CC host procedure 1800 again. After task 1812, procedure 1800 suspends operation and program control returns to executive 800 (see FIG. 8).

As discussed above, procedure 1800 performs task 1806 when the SMDR call record database includes call records or when at least 3 days have transpired without call activity. Task 1806 sets the simulated ignition signal which RPU 48 outputs to TRU 62. Thus, a system call to CC host 26 (see FIG. 1) may be placed whether or not vehicle ignition is "on". Next, a task 1814 places a call to CC host 26. This call is placed by queueing the appropriate digits and send messages to TRU 62. The appropriate digits may be written during a remote programming session and stored within CMR 12, as shown at data element 1612 in FIG. 16. After task 1814, an inquiry process 1900 determines whether a security login process was successfully performed. Process 1900 is discussed below in more detail in connection with FIG. 19.

Figure 19:
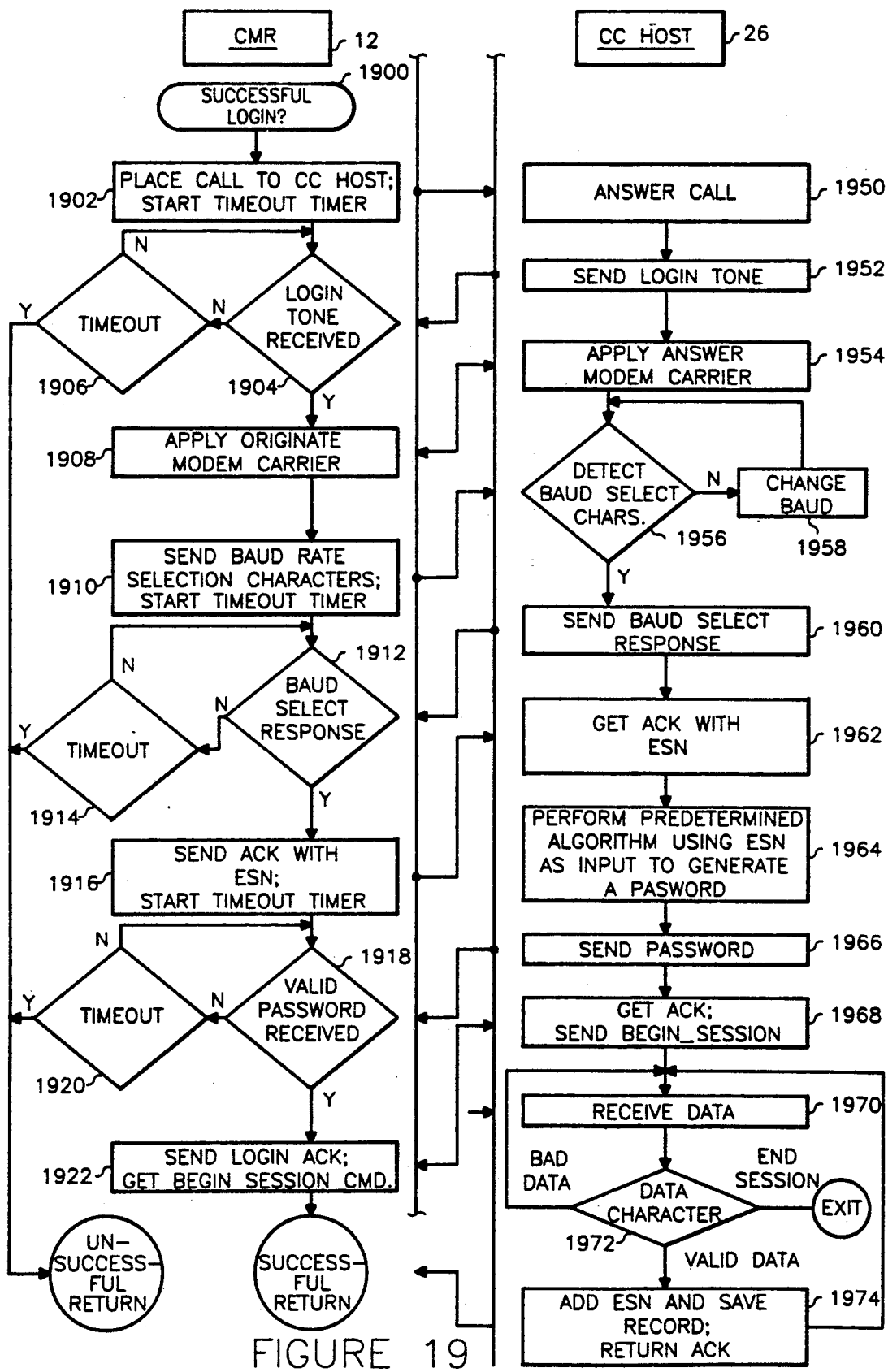
FIG. 19 shows a ping-pong diagram and flow chart which describes a security login procedure performed between the RPU portion of the CMR and the credit card host.

FIG. 19 shows a ping-pong timing diagram of events that take place between CMR 12 and CC host 26 during a preferred security login process 1900. In addition, FIG. 19 shows flow charts of tasks performed by both CMR 12 and CC host 26 during process 1900.

In a task 1902, CMR 12 places a call to CC host 26, as discussed above in connection with task 1814 of FIG. 18. In addition, task 1902 starts a timeout timer. In response to the placement of this call, CC host 26 answers an incoming call in a task 1950 and sends a predetermined login tone to the calling party (CMR 12) in a task 1952. After CMR 12 places the call to CC host 26, CMR 12 waits during inquiry tasks 1904 and 1906 until either the timeout timer expires or the login tone is received back at CMR 12. The login tone, discussed above, is detected by signal detection circuit 80 (see FIG. 3). When the timeout timer expires, program control exits process 1900 and returns to procedure 1800 with a determination that the login process was unsuccessful.

When task 1904 detects the login tone, CMR 12 performs a task 1908 which applies an originate modem carrier. Likewise, after task 1952, CC host 26 applies an answer modem carrier in a task 1954. After CMR 12 applies its modem carrier, a task 1910 sends predetermined baud rate selection characters and starts another timeout timer. CMR 12 expects to receive a predetermined baud rate selection response back from CC host 26 after the baud rate selection characters are sent. Hence, CMR 12 waits during inquiry tasks 1912 and 1914 until either the timeout timer expires or the baud rate selection response is received back at CMR 12.

In the meantime, after task 1954, CC host 26 waits in an inquiry task 1956 to see if it receives the baud rate selection characters. If it receives improper characters, it may alter the baud rate at which it is expecting to receive the baud rate selection characters in a task 1958, until the proper baud rate is selected. When CC host 26 detects the baud rate selection characters, a task 1960 returns the baud selection response to the calling party (CMR 12).

Referring back to the activities of CMR 12, if the timeout timer expires, program control exits process 1900 and returns to procedure 1800 with a determination that the login process was unsuccessful. However, when task 1912 detects the baud rate selection response, CMR 12 performs a task 1916. Task 1916 sends an acknowledgment response back to the called party (CC host 26). This acknowledgement response includes data which is encoded to communicate the ESN of CMR 12. After this transmission, task 1916 starts another timeout timer. CMR 12 expects to receive a predetermined password back from CC host 26 after the acknowledgment and ESN message is sent. Hence, CMR 12 waits during inquiry tasks 1918 and 1920 until either the timeout timer expires or the expected password is received back at CMR 12.

While CMR 12 is waiting, CC host 26 receives the acknowledgment message with the appended ESN in a task 1962. Next, in a task 1964, CC host 26 uses the ESN as an input to a predetermined algorithm which generates a password. The particular algorithm utilized in task 1964 is not important to the present invention, so long as it generates a reasonably unique password which is difficult to decrypt from an ESN, and vice-versa. Many such algorithms are well known to those skilled in the art. For example, the algorithm may simply associate a list of random numbers with the ESN's of client CMRs 12. The random numbers may serve as the passwords for the client CMRs 12. Once this password has been obtained, a task 1966 sends the password back to the calling party (CMR 12).

Referring back to the activities of CMR 12, when the timeout timer expires, program control exits process 1900 and returns to procedure 1800 with a determination that the login process was unsuccessful. However, when task 1918 detects the expected password, CMR 12 performs a task 1922. Task 1922 sends a login acknowledgement message back to CC host 26 with a data upload command, and gets a begin session command back from CC host 26 in response. At this point, CMR 12 has determined that the login process was successfully completed, and program control returns to procedure 1800 (see FIG. 18) to transfer call records to CC host 26.

With reference to the activities of CC host 26, after task 1966, CC host 26 performs a task 1968 in which it gets the login acknowledgment and data upload command from CMR 12. In response, task 1968 prepares to receive call records from CMR 12 and returns the begin session command to CMR 12.

With reference back to FIG. 18, upon an unsuccessful login process, a task 1816 drops the call. The call is dropped by queuing an end message to TRU 62. After task 1816, an inquiry task 1818 inquires whether this CMR's hourly reporting window, discussed above in connection with trace C of FIG. 11, has expired yet. If the hourly reporting window has not yet expired, then program control returns to task 1814 in an attempt to successfully establish another call with CC host 26.

Upon a successful login process, an inquiry task 1820 determines whether there are any records in the SMDR call record database to upload to CC host 26. When no records are present, CMR 12 sends an end session command to CC host 26 in a task 1822. Next, a task 1824 drops the call, and a task 1826 resets the counter which keeps track of the number of days encountered without call activity to zero if it is currently displaying a number greater than two.

One situation in which tasks 1822-1826 are performed is when CMR 12 has experienced three or more days without call activity. In this situation, the call to CC host 26 informs CC host 26 that CMR 12 is still in the vicinity and functioning properly. However, if CC host 26 fails to receive reports from one of its client CMRs 12 for a period of over three days, then a possible problem is indicated. In response to this indication, CC host 26 may inform RP host 24 of the possible problem so that an investigation may be scheduled for maintenance personnel.

Another situation in which tasks 1822-1826 are performed is after all call records have been successfully transmitted to CC host 26. However, when task 1820 detects at least one call record in the SMDR database, a task 1828 attempts to upload a single call record to CC host 26 and increments an attempt counter.

This call record is formatted in an efficient form for uploading to CC host 26. FIG. 20 illustrates the efficient data format utilized in the preferred embodiment of the present invention to upload a call record 2000. With reference to FIG. 20, call record 2000 compacts numerical data, such as MIN, SID, time, date, expiration dates, identification numbers, and dialed digits into a compact, binary coded decimal (BCD), form. Consequently, an entire record requires a maximum of 50 bytes of data, including error detection overhead data, and often requires less than that. Moreover, call record 2000 omits an ESN number which is necessary to identify the entity, such as a rental car agency, who is providing cellular pay-service and to whom payments are due. Rather, the ESN was previously sent to CC host 26 during the login procedure and is appended to the call record by CC host 26 after CC host 26 receives the call record.

Specifically, as shown back in FIG. 19, after CC host 26 receives data in a task 1970, an inquiry task 1972 determines whether the data is a valid call record, an end session command, or invalid data. If the data is invalid, CC host 26 returns a no-acknowledge message and returns to task 1970 to receive additional data. However, if the data is a valid call record, a task 1974 adds the ESN to the received call record and stores the expanded call record for later formatting and transmitting to billing system 28 (see FIG. 1). In addition, task 1974 returns an acknowledgement of the received call record to CMR 12. When an end session command is received, CC host 26 exits its routine and waits for another incoming call.

With reference back to FIG. 18, after task 1828, an inquiry task 1830 determines whether the acknowledgement was returned from CC host 26 within a predetermined period of time. When the call record acknowledgment is received, program control returns to task 1820 to upload another record or quit if all records have been uploaded. On the other hand, when the call record acknowledgment is not detected at task 1830, an inquiry task 1832 determines whether at least three attempts at uploading the call record have occurred yet. If three attempts have not yet occurred, program control simply returns to task 1828 to attempt to upload the call record again.

When task 1832 determines that at least three unsuccessful attempts at uploading a call record to CC host 26 have been tried, task 1816 drops the call. As discussed above, after task 1816, an inquiry task 1818 routes program control back to task 1814 to place another call to CC host 26 again when CMR 12 has time remaining in its hourly reporting window. However, when the hourly reporting window has expired, a task 1834 causes the simulated ignition signal output to TRU 62 to match the vehicle's ignition. In other words, if the vehicle is turned "off", task 1834 de-energizes TRU 62 to conserve battery power. After task 1834, an inquiry task 1836 determines if the previous hourly reporting window was the last hourly reporting window of the daily reporting window (see FIG. 11). At the last hour of the daily reporting window, program control returns to task 1810, discussed above. However, if CMR 12 will encounter additional hourly reporting windows within the current daily reporting window, a task 1838 adjusts the wake-up time to the first minute of the next hourly reporting window. After task 1838, program control returns to task 1812, discussed above.

As discussed above, background application procedure 1000 (see FIG. 10) monitors the current time to determine when to engage in a remote programming session. When this time occurs, procedure 1000 enables RP session procedure 2100. Executive 800 (see FIGS. 8-9) then routes program control to RP session procedure 2100 as soon as possible.

Figure 21:
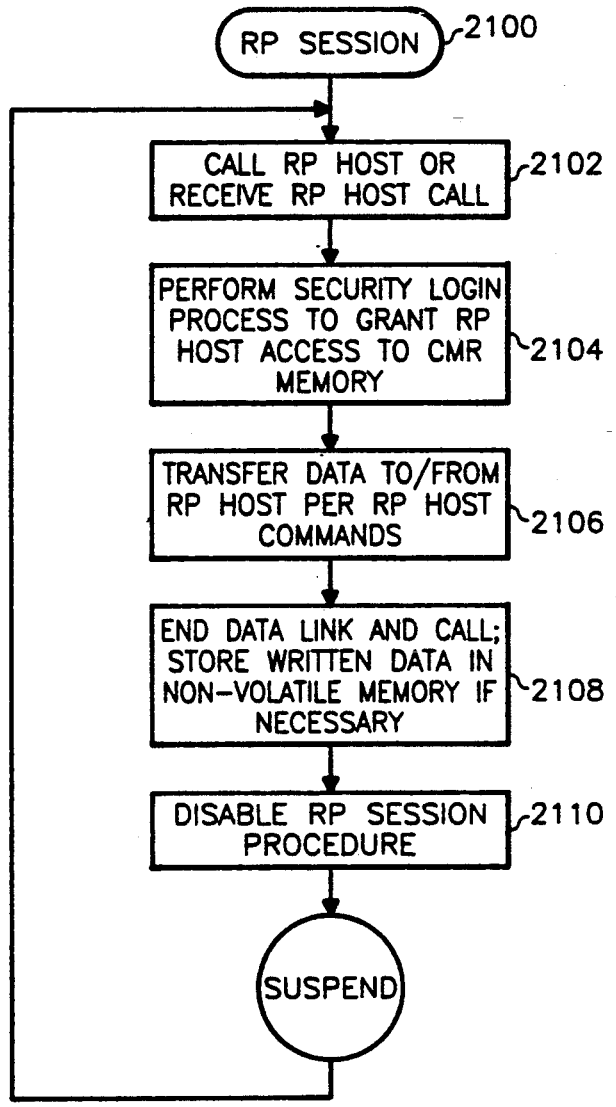
FIG. 21 shows a flow chart of a remote programming (RP) session application procedure performed by the RPU portion of the present invention.

FIG. 21 shows a flow chart of tasks performed within RP session procedure 2100. In a task 2102, CMR 12 establishes a call with RP host 24 (see FIG. 1). This call may be placed by CMR 12 and answered by RP host 24 in a manner similar to that discussed above in connection with CC host procedure 1800 (see FIG. 18). Alternatively, this call may be placed by RP host 24 and answered by CMR 12. After task 2102, a task 2104 performs a security login process similar to that discussed above in connection with FIG. 19. However, nothing requires RP host 24 to login using the same password that CC host 26 uses. Once RP host 24 logs into CMR 12, RP host 24 has access to memory space 1600 (see FIG. 16) of CMR 12.

Next, a task 2106 causes CMR 12 to perform data transfer operations to or from RP host 24 in accordance with commands issued from RP host 24. Thus, RP host 24 may read memory locations within CMR 12 and may write data to memory locations within CMR 12. After task 2106, a task 2108 ends the session with RP host 24, drops the call, and stores any data within non-volatile memory 72 (see FIG. 3) which may require such action. After task 2108, a task 2110 disables RP session procedure 2100 so that it will not be invoked again until its next scheduled time. After task 2110, procedure 2100 suspends operation and program control returns to executive 800 (see FIG. 8).

In summary, the present invention provides an improved pay service system and method. The present invention refrains from making system calls prior to each customer call. Rather, system calls are made only when telephone usage suggests that external credit card validation is prudent and when call records need to be reported. The call records are reported when a local CMR database becomes full, which occurs only rarely, or in accordance with a daily reporting schedule, which is configured to occur only during off-peak hours. Thus, the present invention efficiently utilizes cellular radiotelephone airtime, reduces costs associated with system calls, and frees customers from having to wait for external credit card validation prior to making customer calls. In addition, the present invention accumulates sufficient billing records within the CMR so that billing may be performed without requiring the cooperation of a cellular administration system. Moreover, the present invention minimizes pay-service costs by utilizing conventional cellular equipment to a great extent and by providing a non-paystation mode of operation which gives the present invention value for uses other than as a credit card paystation.

The present invention has been described above with reference to a preferred embodiment. However, those skilled in the art will recognize that changes and modifications may be made in this preferred embodiment without departing from the scope of the present invention. For example, those skilled in the art may adapt the teaching of the present invention so that a transmit/receive unit (TRU) incorporates the remote programming unit (RPU) features described herein. Likewise, the teaching of the present invention may be adapted to portable, roadside, and other cellular telephone equipment. In addition, nothing prevents adaption of the CMR and system described herein to incorporate additional capabilities and features. Such additional capabilities and features may result from processing data passed between a TRU and CU of a CMR, from processing other types of credit cards, and the like. Furthermore, those skilled in the art will recognize that the various specific tasks and procedures described herein in connection with the preferred embodiment may be altered significantly without departing from the scope of the present invention. These and other changes and modifications which are obvious to those skilled in the art are intended to be included within the scope of the present invention.

What is claimed is:

1. A method of operating a cellular radiotelephone as a mobile pay phone, said method comprising the steps of:
   locally determining whether to enable operation of said radiotelephone;
   enabling operation of said radiotelephone in response to said locally determining step;
   monitoring usage of said radiotelephone;
   detecting when said usage of said radiotelephone reaches a predetermined usage criteria; and
   consulting, in response to said detecting step, a remote service to determine whether to continue enabled operation of said radiotelephone.

2. A method as claimed in claim 1 wherein said cellular radiotelephone is remotely programmable, and said method additionally comprises the step of remotely programming said usage criteria.

3. A method as claimed in claim 1 additionally comprising, prior to said locally determining step, the step of disabling operation of said radiotelephone in response to energization of said radiotelephone.

4. A method as claimed in claim 1 wherein:
said monitoring usage step comprises the step of recording the quantity of calls placed through said radiotelephone; and
said detecting step determines that said usage criteria has been reached when said quantity exceeds a predetermined number.

5. A method as claimed in claim 1 wherein:
said monitoring usage step comprises the step of recording the total duration of calls placed through said radiotelephone; and
said detecting step determines that said usage criteria has been reached when said duration exceeds a predetermined duration.

6. A method as claimed in claim 1 wherein said locally determining step comprises the steps of:
reading credit card information from a credit card; and
processing said credit card information to perform a local validation of said credit card.

7. A method as claimed in claim 6 wherein said consulting step comprises the steps of:
automatically establishing a data communications session with a credit authorization system; and
disabling operation of said radiotelephone if said credit card authorization system invalidates said credit card.

8. A method as claimed in claim 6 additionally comprising the steps of:
continually maintaining a current time and date in a clock portion of said radiotelephone;
storing at least one call record, each call record being associated with a single call, and each call record including data describing said usage of said radiotelephone along with said credit card information for said single call;
monitoring said clock to determine the occurrence of a predetermined point in time;
automatically placing a system call with a host computer system when said monitoring step detects the occurrence of said predetermined point in time; and
if said system call is successfully established, transferring said at least one call record to said host computer system during said system call.

9. A method as claimed in claim 6 additionally comprising the steps of:
examining said credit card information to determine if said credit card requires pre-purchase authorization; and
if said credit card requires pre-purchase authorization, externally validating said credit card prior to enabling operation of said radiotelephone.

10. A method of operating a remotely programmable cellular telephone as a credit card paystation, said method comprising the steps of:
disabling operation of said telephone in response to telephone energization;
reading credit card information from a credit card;
performing a local validation of said credit card by processing said credit card information;
enabling operation of said telephone if said local validation step successfully validates said credit card;
recording usage of said telephone;
comparing said recorded usage of said telephone with a predetermined fraud alert usage threshold;
when said predetermined fraud alert usage threshold is exceeded, automatically establishing a data communications session with a credit card authorization system to remotely validate said credit card; and
if said credit card authorization system invalidates said credit card, disabling operation of said telephone.

11. A method as claimed in claim 10 wherein:
said recording usage step comprises the step of recording the quantity of calls placed through said telephone; and
said comparing step determines that said fraud alert threshold has been exceeded when said quantity exceeds a predetermined number.

12. A method as claimed in claim 10 wherein:
said recording usage step comprises the step of recording the total duration of calls placed through said telephone; and
said comparing step determines that said fraud alert threshold has been exceeded when said duration exceeds a predetermined duration.

13. A method as claimed in claim 10 wherein:
said recording usage step comprises the step of recording the quantity of calls placed through said telephone within a preceding predetermined period of time; and
said comparing step determines that said fraud alert threshold has been exceeded when said quantity exceeds a predetermined quantity.

14. A method as claimed in claim 10 wherein said method additionally comprises the step of periodically receiving data from outside of said telephone, said data serving to program said predetermined fraud alert threshold.

15. A method as claimed in claim 10 wherein:
when said credit card authorization system validates said credit card, said method additionally comprises the step of allowing repetition of said reading, performing, and enabling steps; and
when said credit card authorization invalidates said credit card, said method additionally comprises the step of prohibiting repetition of said enabling step.

16. A method as claimed in claim 15 additionally comprising, after said prohibiting repetition step, the step of receiving data from outside of said telephone, said data serving to program said telephone to allow repeating said enabling step.

17. A method as claimed in claim 10 additionally comprising the steps of:
continually maintaining a current time and date in a clock portion of said telephone;
storing at least one call record, each call record being associated with a single call, and each call record including data describing said usage of said telephone along with said credit card information for said single call;
monitoring said clock to determine the occurrence of a predetermined point in time;
automatically placing a system call with a host computer system when said monitoring step detects the occurrence of said predetermined point in time; and
if said system call is successfully established, transferring said at least one call record to said host computer system during said system call.

18. A method as claimed in claim 10 additionally comprising the steps of:
   programming a data flag to indicate operation of said telephone in one of paystation telephone and non-paystation telephone modes of operation; and
   performing said disabling, reading, performing, recording, comparing, and establishing steps when said data flag indicates operation in said paystation telephone mode; and
   omitting said disabling, reading, performing, and establishing steps when said data flag indicates operation in said non-paystation telephone mode.

19. A method as claimed in claim 18 wherein said reading step reads said credit card information through a communication link with a credit card reader portion of said telephone, and said programming step comprises the step of monitoring said communication link to determine whether said credit card reader portion of said telephone is coupled to said telephone.

20. A method as claimed in claim 10 wherein:
   said credit card information includes an issuer identification number, an individual account identification number, a multiplicity of parity data bits dispersed throughout said identification numbers, a check digit number, and a longitudinal redundancy check number; and
   said performing step comprises the steps of:
      verifying said parity data bits;
      verifying said longitudinal redundancy check number;
      verifying said check digit number; and
      comparing said issuer identification number against a table of valid issuer identification number ranges stored within said telephone.

21. A method as claimed in claim 20 additionally comprising the step of periodically receiving updated versions of said table of valid issuer identification number ranges from outside of said telephone.

22. A method as claimed in claim 10 additionally comprising the steps of:
   examining said credit card information to determine if said credit card requires pre-purchase authorization; and
   if said credit card requires pre-purchase authorization, externally validating said credit card prior to enabling operation of said radiotelephone.

* * * * *